US012623786B2

(12) United States Patent
Kobayashi et al.

(10) Patent No.: US 12,623,786 B2
(45) Date of Patent: May 12, 2026

(54) AIRCRAFT WITH BOUNDARY LAYER INGESTION DEVICE HAVING CENTER POSITION BETWEEN CENTER POSITION OF FUSELAGE AND CENTER POSITION OF REAR END PORTION OF FUSELAGE

(71) Applicant: JAPAN AEROSPACE EXPLORATION AGENCY, Tokyo (JP)

(72) Inventors: Hiroshi Kobayashi, Tokyo (JP); Yuzuru Yokokawa, Tokyo (JP); Masayuki Suzuki, Tokyo (JP); Akira Nishizawa, Tokyo (JP); Ryuji Iijima, Tokyo (JP); Eiji Shima, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 58 days.

(21) Appl. No.: 18/687,142

(22) PCT Filed: Oct. 12, 2022

(86) PCT No.: PCT/JP2022/038038
§ 371 (c)(1),
(2) Date: Sep. 19, 2024

(87) PCT Pub. No.: WO2023/074368
PCT Pub. Date: May 4, 2023

(65) Prior Publication Data
US 2025/0010996 A1      Jan. 9, 2025

(30) Foreign Application Priority Data
Oct. 26, 2021    (JP) ................................. 2021-174711

(51) Int. Cl.
B64D 27/20      (2006.01)
B64C 1/00       (2006.01)
B64C 1/16       (2006.01)

(52) U.S. Cl.
CPC ................ B64D 27/20 (2013.01); B64C 1/00 (2013.01); B64C 1/16 (2013.01); B64C 2001/0045 (2013.01)

(58) Field of Classification Search
CPC ......... B64C 21/00; B64C 21/01; B64C 21/06; B64C 1/16; B64C 29/04; B64D 27/14;
(Continued)

(56) References Cited

U.S. PATENT DOCUMENTS 9,291,101 B2 *    3/2016   Florea .................... B64D 33/02
10,358,228 B2 *   7/2019   Marrinan ............... B64D 33/02
(Continued)

FOREIGN PATENT DOCUMENTS

JP        2019-39420 A       3/2019
JP        2020-40649 A       3/2020
WO        WO-2019243119 A1 *  12/2019  ............. F02K 3/072

OTHER PUBLICATIONS

International Search Report dated Dec. 6, 2022 in International Application No. PCT/JP2022/038038.
(Continued)

*Primary Examiner* — Arfan Y. Sinaki
(74) *Attorney, Agent, or Firm* — SALIWANCHIK, LLOYD & EISENSCHENK

(57) ABSTRACT

An aircraft according to the present technology includes: a fuselage section; and a BLI propulsion section. The fuselage section has a cylindrical shape that is long in an axial direction and short in a width direction and a vertical direction, and includes a rear end portion on a rear side in the axial direction. The BLI propulsion section is a BLI pro-
(Continued)

pulsion section that is provided on a rear side of the fuselage section and includes an intake port, a center position of the intake port being offset from a center position of the rear end portion in at least one of the vertical direction or the width direction.

16 Claims, 22 Drawing Sheets

(58) Field of Classification Search
CPC . B64D 27/20; B64D 27/32; B64D 2033/0286
See application file for complete search history.

(56) References Cited

U.S. PATENT DOCUMENTS

| | | | | |
|---|---|---|---|---|
| 10,934,008 | B2 * | 3/2021 | Vondrell | B64C 29/0033 |
| 11,124,291 | B2 * | 9/2021 | Terwilliger | B64C 21/01 |
| 11,338,901 | B2 * | 5/2022 | Loebig | B64D 27/31 |
| 2015/0000252 | A1 | 1/2015 | Moore et al. | |
| 2015/0122952 | A1 * | 5/2015 | Florea | B64D 27/20 137/15.1 |
| 2015/0321764 | A1 * | 11/2015 | Voytovych | B64D 27/14 244/54 |
| 2019/0002115 | A1 | 1/2019 | Miller et al. | |
| 2020/0070995 | A1 | 3/2020 | Papas et al. | |
| 2020/0189724 | A1 * | 6/2020 | Terwilliger | B64C 21/01 |
| 2020/0339241 | A1 * | 10/2020 | Loebig | B64D 35/022 |
| 2022/0355916 | A1 * | 11/2022 | Gottapu | B64D 27/402 |

OTHER PUBLICATIONS

Gray, J. S. et al., "Modeling Boundary Layer Ingestion Using a Coupled Aeropropulsive Analysis," Journal of Aircraft, 2018, 55(3):1191-1199.
Office Action dated Aug. 5, 2025 in Japanese Application No. 2021-174711.

* cited by examiner

45

42
(42b)

42
(42a)

Z

X — Y

100

100

10

40 11

10.5°

50

101

110

111 140

10.5°

150

102

210

211 240

10.5°

250

Distribution of Mach numbers in each flow direction cross section (tip portion of fuselage: x = 0)

x=25.0m(D/Dmax=1, S/Smax=1)

x=26.0m(D/Dmax=0.94, S/Smax=0.91)

x=27.0m(D/Dmax=0.85, S/Smax=0.77)

x=28.0m(D/Dmax=0.76, S/Smax=0.63)

x=29.0m(D/Dmax=0.67, S/Smax=0.47)

x=30.0m(D/Dmax=0.57, S/Smax=0.32)

x=31.0m(D/Dmax=0.49, S/Smax=0.20)

x=32.0m(D/Dmax=0.39, S/Smax=0.10)

x=33.0m(D/Dmax=0.29, S/Smax=0.03)

AIRCRAFT WITH BOUNDARY LAYER INGESTION DEVICE HAVING CENTER POSITION BETWEEN CENTER POSITION OF FUSELAGE AND CENTER POSITION OF REAR END PORTION OF FUSELAGE

CROSS-REFERENCE TO RELATED APPLICATIONS

This application is the U.S. national stage application of International Patent Application No. PCT/JP2022/038038, filed Oct. 12, 2022, which claims the benefit under 35 U.S.C. § 119 of Japanese Application No. 2021-174711, filed Oct. 26, 2021, the disclosures of each of which are incorporated herein by reference in their entirety.

TECHNICAL FIELD

The present invention relates to a technology for an aircraft that includes a BLI propulsion device on its rear side, and the like.

BACKGROUND ART

In recent years, a device called a BLI propulsion device (BLI: Boundary Layer Ingestion) has become known as a type of propulsion device that generates thrust in an aircraft (see the following Non-Patent Literature 1).

The BLI propulsion device takes in slow airflow near the surface of the aircraft, and accelerates and discharges the taken-in airflow backwards, thereby generating thrust in the travelling direction of the aircraft. The BLI technology is a technology based on the viewpoint that it is more efficient to accelerate slow airflow to obtain thrust than to further accelerate fast airflow to obtain thrust.

CITATION LIST

Non-Patent Literature

Non-Patent Literature 1 Modeling Boundary Layer Ingestion Using a Coupled Aeropropulsive Analysis" JOURNAL OF AIRCRAFT Vol. 55, No. 3, May-June 2018

DISCLOSURE OF INVENTION

Technical Problem

In the BLI propulsion technology, there is a demand for a technology capable of improving propulsion efficiency.

In view of the circumstances as described above, it is an object of the present technology to provide a technology capable of improving propulsion efficiency in the BLI propulsion technology.

Solution to Problem

In order to achieve the above-mentioned object, an aircraft according to the present technology includes: a fuselage section; and a BLI propulsion section.

The fuselage section has a cylindrical shape that is long in an axial direction and short in a width direction and a vertical direction, and includes a rear end portion on a rear side in the axial direction.

The BLI propulsion section is a BLI propulsion section that is provided on a rear side of the fuselage section and includes an intake port, a center position of the intake port being offset from a center position of the rear end portion in at least one of the vertical direction or the width direction.

By causing the center position of the intake port to be offset from the center position of the rear end portion of the fuselage section, it is possible to efficiently take in slow airflow from the intake port, thereby improving propulsion efficiency.

In the aircraft, the fuselage section may have a shape in which an outer diameter gradually decreases toward the rear end portion on the read side of the fuselage section.

In the aircraft, the center position of the rear end portion may be located above a center position of the fuselage section in the vertical direction.

In the aircraft, the center position of the intake port may be offset below the center position of the rear end portion in the vertical direction.

In the aircraft, the center position of the intake port may be located between the center position of the fuselage section and the center position of the rear end portion in the vertical direction.

In the aircraft, an area of a non-overlapping region where a projection plane when parallel light parallel to the axial direction is applied to the fuselage section and a projection plane when the parallel light is applied to the intake port do not overlap with each other may occupy less than 60%

In the aircraft, a value of AR may be 1.3 or more, AR being represented by $(2a)^2/Sfan$, 2a being a length of the intake port in the width direction, Sfan being an area of the intake port.

In the aircraft, the BLI propulsion section may include at least one blade section that is rotatable with an axis directed in the axial direction as a central axis.

In the aircraft, the BLI propulsion section may include a first impeller and a second impeller aligned in the width direction, a rotation direction of the first impeller and a rotation direction of the second impeller are in opposite directions.

In the aircraft, the rotation direction of each of the first impeller and the second impeller may be a rotation direction corresponding to inboard-up rotation.

In the aircraft, the BLI propulsion section may include a third impeller that is located between the first impeller and the second impeller in the width direction and below the first impeller and the second impeller in the vertical direction.

In the aircraft, the impeller may have a central axis of rotation located above the center position of the intake port in the vertical direction.

In the aircraft, the impeller may have a central axis of rotation located outside the center position of the intake port in the width direction.

The aircraft may further include a landing section provided below the fuselage section, an angle formed between the axial direction and a tangent connecting a ground contact point of the landing section and the lowest point of the BLI propulsion section in a shape of a projection plane when parallel light parallel to the width direction is applied to the fuselage section and the landing section exceeding 10.5°.

In the aircraft, a shape of a curve indicating a lower side on the rear side of the fuselage section in a shape of a projection plane when parallel light parallel to the width direction is applied to the fuselage section may be a shape that is twice differentiable and has an inflection point.

In the aircraft, the intake port may be disposed behind the inflection point in the axial direction.

In the aircraft, the intake port may be disposed behind a position where a width of the fuselage section is 50% of a maximum value of the width of the fuselage section in the axial direction.

In the aircraft, a position of the BLI propulsion section corresponding to the center position of the intake port may be not joined to the fuselage section.

In the aircraft, the intake port may be disposed behind a position where a cross-sectional area of the fuselage section perpendicular to the axial direction is 25% of a maximum value of the cross-sectional area in the axial direction.

The aircraft may further include a main engine section that includes a generator, the BLI propulsion section being driven by electric power from the generator.

In the aircraft, the generator may be operated at an extracted torque of 100% or less and 90% or more of a maximum torque of the generator, regardless of an operating state of the aircraft.

In the aircraft, power extracted from the generator may be limited to a predetermined value or less in a case where at least one of a condition that an altitude of the aircraft is a predetermined altitude or less or a condition that speed of the aircraft is a predetermined speed or less is satisfied.

In the aircraft, the main engine section may include a plurality of main engines each including the generator, and power extracted from the generator may be limited to a predetermined value or less in a case where a condition that at least one of the plurality of main engines has stopped is satisfied in addition to a condition that the at least one of the two conditions is satisfied.

In the aircraft, the main engine section may include an engine shaft that rotates to cause the generator to generate electric power, and an extracted torque extracted from the generator may be limited to 10% or less of a maximum value of the extracted torque in a case where a rotation speed of the engine shaft of the main engine section is 60% or less of a maximum rotation speed of the engine shaft at that altitude.

In the aircraft, an extracted torque extracted from the generator may be limited to 10% or less of a maximum value of the extracted torque in a case where an engine output of the main engine section is 60% or less of a maximum value of the engine output at that altitude.

A BLI propulsion section according to the present technology is a BLI propulsion section that is provided on a rear side of a fuselage section and includes an intake port, the fuselage section having a cylindrical shape that is long in an axial direction and short in a width direction and a vertical direction and including a rear end portion on a rear side in the axial direction, a center position of the intake port being offset from a center position of the rear end portion in at least one of the vertical direction or the width direction.

Advantageous Effects of Invention

As described above, according to the present invention, it is possible to provide a technology capable of improving propulsion efficiency in a BLI propulsion technology.

MODE(S) FOR CARRYING OUT THE INVENTION

Embodiments of the present invention will be described below with reference to the drawings.

First Embodiment

<Configuration of Entire Aircraft 100>

Figure 1:
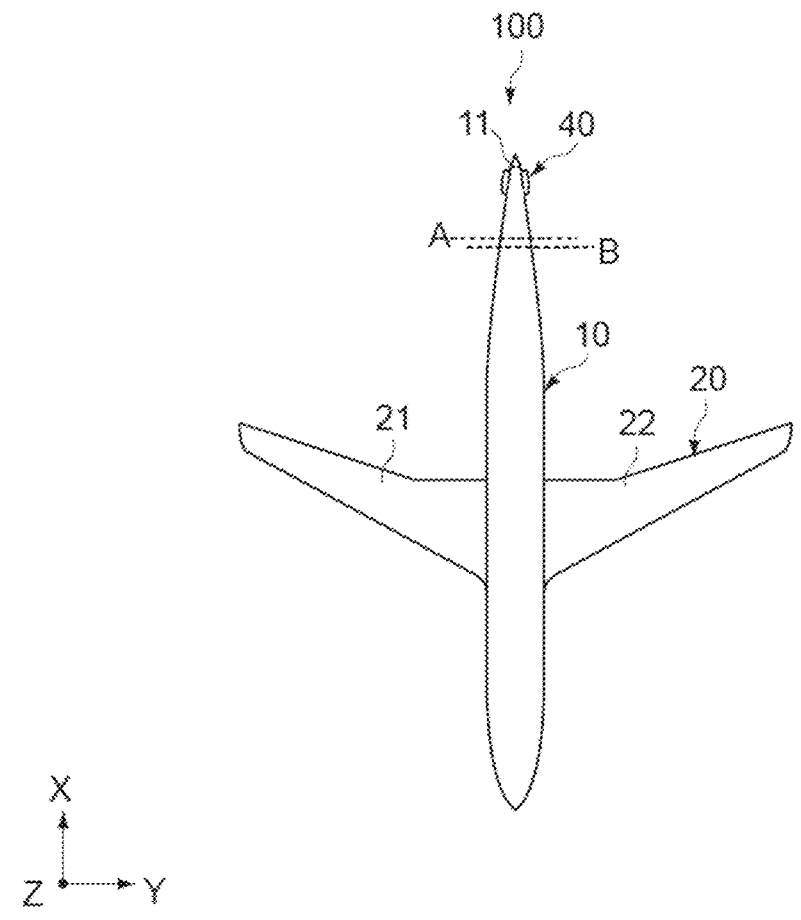
FIG. 1 is a top view showing an aircraft according to a first embodiment of the present invention.
Figure 2:
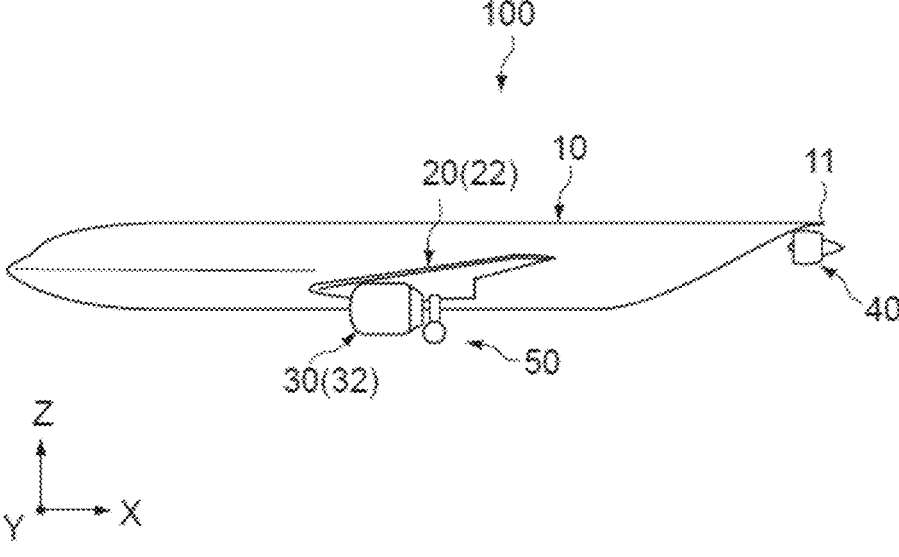
FIG. 2 is a side view showing the aircraft.

FIG. 1 is a top view showing an aircraft 100 according to a first embodiment of the present invention. FIG. 2 is a side view of the aircraft 100, and FIG. 3 is a front view of the aircraft 100.

Figure 3:
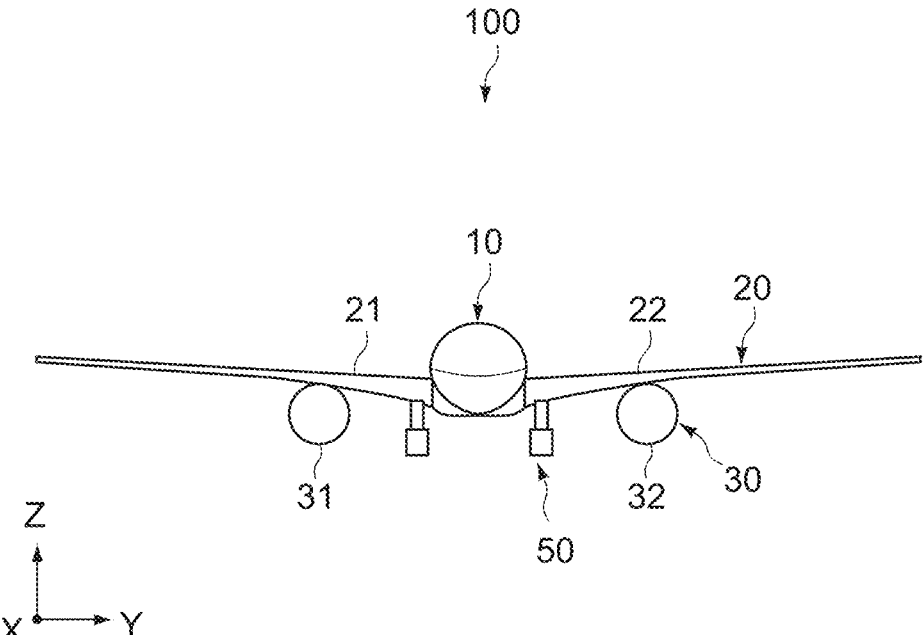
FIG. 3 is a front view showing the aircraft.

As shown in FIG. 1 to FIG. 3, the aircraft 100 includes a fuselage section 10, a main wing section 20, a main engine section 30, a BLI propulsion section 40, and a landing section 50.

The fuselage section 10 has a cylindrical shape that is long in the axial direction (X-axis direction) and short in the width direction (Y-axis direction) and the vertical direction (Z-axis direction). Further, the fuselage section 10 includes a rear end portion 11 on the rear side in the axial direction, and the rear side of the fuselage section 10 is formed such that the outer diameter thereof gradually decreases toward the rear end portion 11.

The main wing section 20 includes a pair of right and left main wings 21 and 22 provided on the fuselage section 10. The two main wings 21 and 22 are provided so as to extend outward in the width direction (Y-axis direction) from the right and left sides of the fuselage section 10.

Note that although omitted for the sake of clarity in the drawings, a tail is provided near the rear end portion 11 of the fuselage section 10. The tail may be of any type, such as a T-shaped tail, a cross-shaped tail, and a V-shaped tail.

The main engine section 30 generates thrust for flight of the aircraft 100 together with the BLI propulsion section 40. The main engine section 30 includes two main engines 31 and 32. The two main engines 31 and 32 are respectively provided at positions below the right and left main wings 21 and 22. Note that the number of main engines may be two or more and is not particularly limited.

Figure 4:
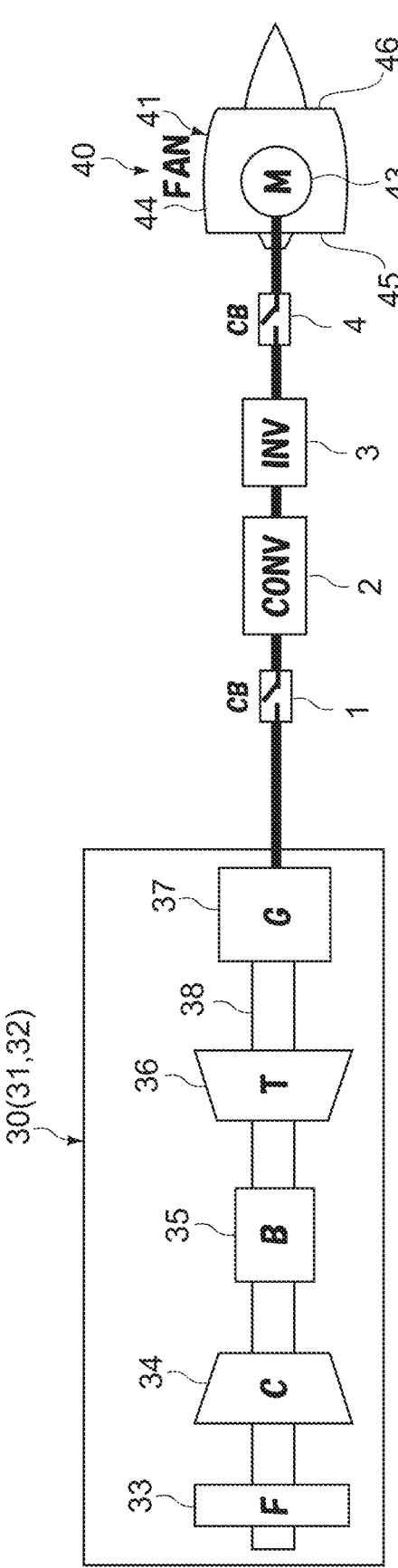
FIG. 4 is a block diagram showing an internal configuration of a main engine section and an electrically connected state of the main engine section and a BLI propulsion section.

FIG. 4 is a block diagram showing an internal configuration of the main engine section 30 and an electrically connected state of the main engine section 30 and the BLI propulsion section 40. The main engines 31 and 32 are each, for example, a jet engine, and each include a fan 33, a compressor 34, a combustor 35, a turbine 36, a generator 37, an engine shaft 38, and the like. Note that although a turbofan engine is taken as an example of the main engine section 30 in this example, the type of main engine section 30 is not particularly limited.

The fan 33 takes in the air in front of it by rotation and generate a jet flow. The compressor 34 compresses (part of) the jet flow from the fan and sends the compressed jet flow to the combustor 35 at the rear. The combustor 35 burns fuel in a combustion chamber to expand the compressed air, and sends the jet flow having high temperature the turbine 36 at the rear. The turbine 36 is caused to rotate by the jet flow having high temperature from the combustor 35 and exhaust the jet flow to the rear.

The engine shaft 38 rotates by the rotation of the turbine 36. The rotational force of the engine shaft 38 is used as power for rotation of the fan 33 and the compressor 34, and is also used as power for power generation by the generator 37. Further, the electric power generated by the generator 37 is used as electric power for driving a motor 43 of the BLI propulsion section 40.

A first circuit breaker 1, an AC/DC converter 2, a DC/AC inverter 3, and a second circuit breaker 4 are interposed between the main engines 31 and 32 and the BLI propulsion section 40.

The first circuit breaker 1 and the second circuit breaker 4 switch between an electrically connected state and an electrically disconnected state as necessary. The AC/DC converter 2 converts the alternating current voltage from the generator 37 into a direct current voltage and outputs the direct current voltage to the DC/AC inverter 3. The DC/AC inverter 3 converts the direct current voltage from the AC/DC converter 2 into an alternating current voltage and outputs the alternating current voltage to the motor 43.

With reference to FIGS. 1 to 3 again, the BLI propulsion section 40 generates thrust for flight of the aircraft 100 together with the main engine section 30. The BLI propulsion section 40 includes one BLI propulsion device 41. The BLI propulsion device 41 is provided near the rear end portion 11 on the rear side of the fuselage section 10 in the axial direction (X-axis direction). Note that the number of BLI propulsion devices 41 may be two or more and it not particularly limited.

The BLI propulsion device 41 is a fan that generates thrust for flight of the aircraft 100, and includes an impeller 42 (see FIG. 13, etc.), the motor 43 (see FIG. 4) that causes the impeller 42 to rotate, and a nacelle 44 (see FIG. 4) that houses the impeller 42 and the motor 43 therein. The number of BLI propulsion devices 41 may be one or two or more and is not particularly limited.

The impeller 42 is configured to be rotatable with the axis directed in the axial direction (X-axis direction) as a central axis of rotation. The impeller 42 includes a plurality of fan blades (not shown) regularly arranged along the circumferential direction (direction around the X-axis). The number of impellers 42 may be one or two or more for one BLI propulsion device 41 and is not particularly limited.

The motor 43 causes the impeller 42 to rotate on the basis of the electric power from the generator 37 in the main engine section 30. The nacelle 44 has a cylindrical shape with its axis facing the axial direction (X-axis direction), includes, on the front side in the axial direction, an intake port 45 that sucks airflow, and includes, on the rear side in the axial direction, a discharge port 46 for discharging the airflow accelerated by the impeller 42.

<Center Position of Intake Port 45>

Here, the BLI method is based on the idea that propulsive force can be obtained with higher efficiency (energy efficiency, fuel consumption rate) by accelerating relatively slow airflow flowing near the surface of the airframe to obtain propulsive force than further accelerating relatively fast airflow flowing away from the airframe to obtain propulsive force. That is, it is better to take in relatively slow airflow from the intake port 45 of the BLI propulsion section 40.

Figure 5:
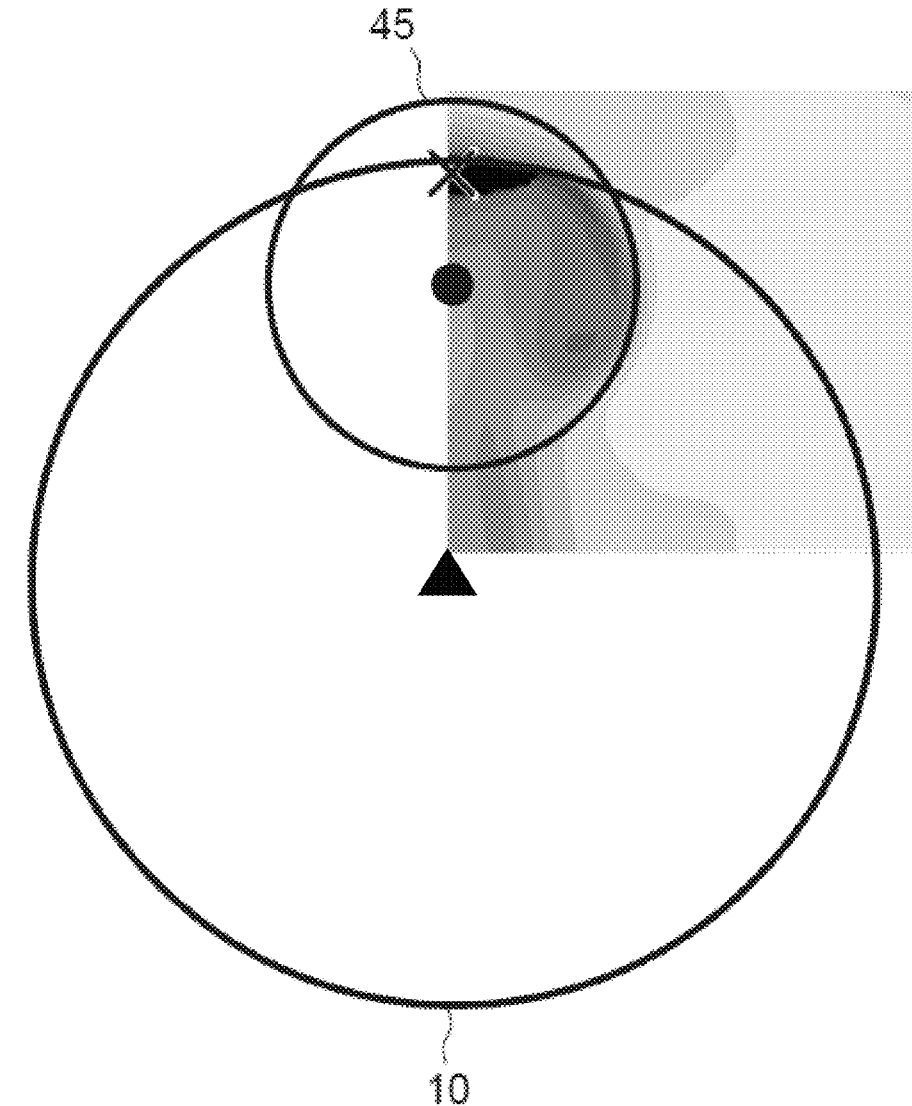
FIG. 5 is a diagram showing the results of a simulation for how fast airflow flows near a rear end portion of a fuselage section.
Figure 5:
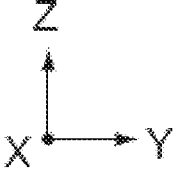

The present inventors have conducted a simulation for how fast airflow flows near the rear end portion 11 in the fuselage section 10 of the aircraft 100. FIG. 5 is a diagram showing the results of a simulation for how fast airflow flows near the rear end portion 11 in the fuselage section 10.

FIG. 5 shows the aircraft 100 as viewed from the rear. Further, the maximum diameter of the shape of the fuselage section 10 in the aircraft 100 is indicated by a large circle, and the shape of the intake port 45 of the BLI propulsion section 40 is indicated by a small circle. Further, the speed of the airflow is shown in gray scale. The darker the black, the slower the airflow is. In FIG. 5, the center position of the fuselage section being at a position corresponding to a maximum diameter of the fuselage section is indicated by the black triangle.

Further, in FIG. 5, the center position (in the width direction and the vertical direction (YZ direction)) of the rear end portion 11 in the fuselage section 10 is indicated by an x mark, and the center position (in the width direction and the vertical direction (YZ direction)) of the intake port 45 is indicated by a black circle.

As shown in FIG. 5, the speed of airflow is slow in a region below the center position (see the x mark) of the rear end portion 11 in the fuselage section 10, particularly, in the diagonally lower right region and the diagonally lower left region as viewed from the center position of the rear end portion 11 in the fuselage section 10 (see the dark portion in the gray scale).

In this regard, in this embodiment, the center position of the intake port 45 is offset below the center position of the rear end portion 11 of the fuselage section 10 in order to take in slower airflow from the intake port 45 in the BLI propulsion section 40.

Figure 6:
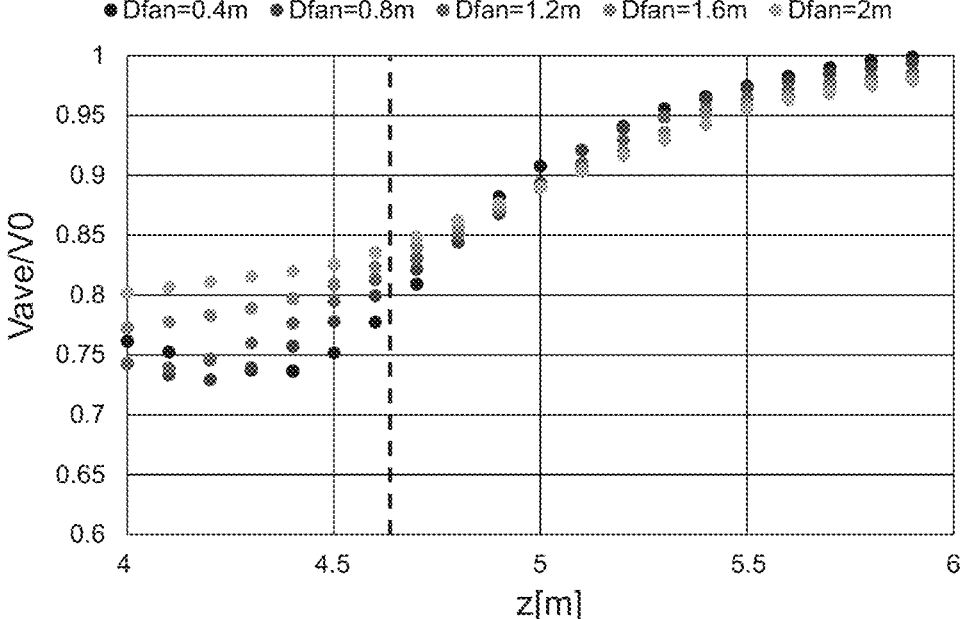
FIG. 6 is a diagram showing an average speed of airflow taken in from an intake port in the case where the center position of the intake port is changed in the vertical direction.

FIG. 6 is a diagram showing an average speed of airflow taken in from the intake port 45 in the case where the center position (see the black circle in FIG. 5) of the intake port 45 is changed in the vertical direction.

In FIG. 6, the horizontal axis indicates the center position of the intake port 45 in the vertical direction (Z-axis direction). Note that a point 1 m below the lowest point of the maximum diameter in the fuselage section 10 (the lowest point of the large circle in FIG. 5) is 0 m and used as a reference. Further, in FIG. 6, the vertical axis indicates an average speed Vave of airflow taken in from the intake port 45 with reference to a speed V0 of the aircraft 100.

Further, FIG. 6 shows the results in the case where diameter of the intake port 45 is changed in five patterns of 0.4 m, 0.8 m, 1.2 m, 1.6 m, and 2 m. Note that although the size of the fuselage section 10, the size of the intake port 45, and the like are described using specific numerical numbers in some cases in the description of this embodiment, these are merely examples. That is, the size of the fuselage section 10, the size of the intake port 45, and the like are not limited to those exemplified and can be changed as appropriate.

As shown in FIG. 6, when the center position of the intake port 45 is changed between 4 m to 6 m from the reference (1 m below the lowest point of the maximum diameter in the fuselage section 10) in the vertical direction, the average speed Vave/V0 of airflow taken in from the intake port 45 gradually increases as the center position of the intake port 45 rises. This tendency appears regardless of the diameter of the intake port 45.

Here, in FIG. 6, a broken vertical line is shown at a position where the center position of the intake port 45 is 4.7 m from the reference (1 m below the lowest point of the maximum diameter of the fuselage section 10). At the position where the center position of the intake port 45 is 4.7 m, the center position of the intake port 45 (black circle in FIG. 5) substantially matches the center position of the rear end portion 11 of the fuselage section 10 (x mark in FIG. 5).

Further, when the center position of the intake port 45 is less than 4.7 m from the reference (1 m below the lowest point of the maximum diameter of the fuselage section 10), the center position of the intake port 45 is offset below the center position of the rear end portion 11 of the fuselage section 10. Conversely, when the center position of the intake port 45 exceeds the position of 4.7 m from the reference, the center position of the intake port 45 is offset above the center position of the rear end portion 11 of the fuselage section 10.

Note that in FIG. 6, the portion indicated by the region on the left side of the broken vertical line where the center position of the intake port 45 is less than 4.7 m from the reference (1 m below the lowest point of the maximum diameter of the fuselage section 10) corresponds to this embodiment.

As shown in FIG. 6, when the center position of the intake port 45 is 4.7 m or more from the reference (1 m below the lowest point of the maximum diameter of the fuselage section 10) and the center position of the intake port 45 is offset above the center position of the rear end portion 11 of the fuselage section 10, the average speed Vave/V0 of airflow taken in from the intake port 45 becomes relatively faster. This tendency appears regardless of the diameter of the intake port 45.

Meanwhile, when the center position of the intake port 45 is less than 4.7 m from the reference (1 m below the lowest point of the maximum diameter of the fuselage section 10) and the center position of the intake port 45 is offset below the center position of the rear end portion 11 of the fuselage section 10, the average speed Vave/V0 of airflow taken in from the intake port 45 becomes relatively slower. This tendency appears regardless of the diameter of the intake port 45.

That is, by causing the center position of the intake port 45 to be offset below the center position of the rear end portion 11 of the fuselage section 10 as in this embodiment, it is possible to reduce the average speed Vave/V0 of airflow taken in from the intake port 45. As a result, it is possible to generate thrust with high efficiency (energy efficiency, fuel consumption rate) in the BLI propulsion section 40.

<Ratio of Downward Offset of the Intake Port 45>

Figure 7:
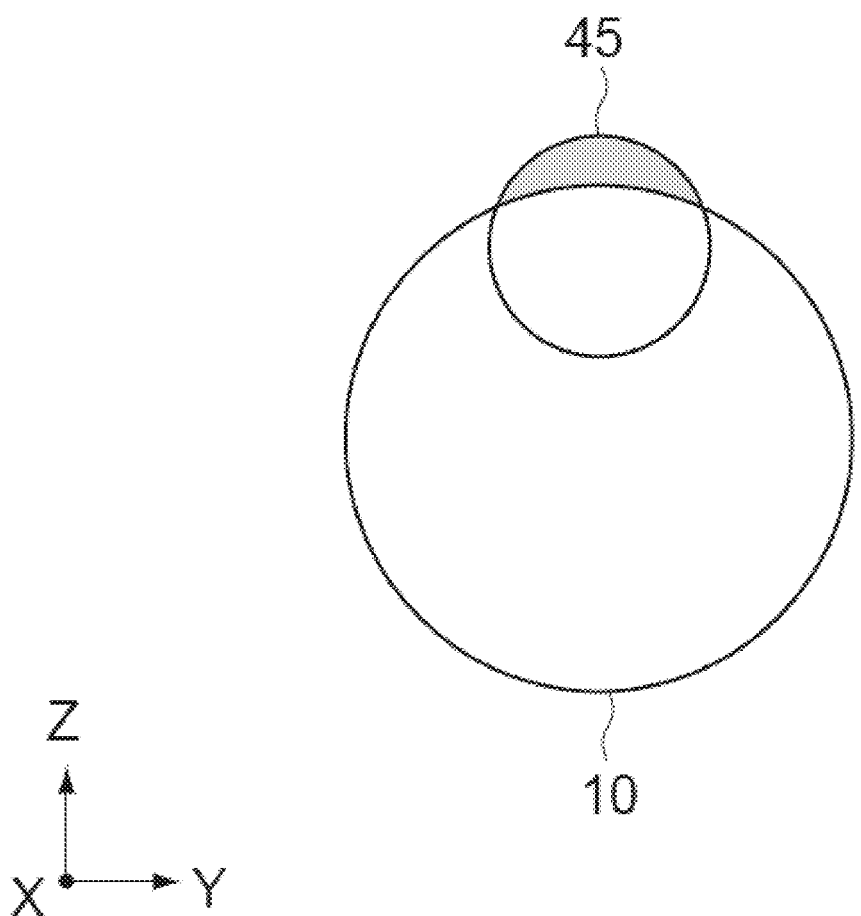
FIG. 7 is a diagram showing a projection plane of the fuselage section and a projection plane of the intake port in the BLI propulsion section.

Next, how much the intake port 45 of the BLI propulsion section 40 should be downwardly offset will be described. FIG. 7 is a diagram showing a projection plane of the fuselage section 10 and a projection plane of the intake port 45 in the BLI propulsion section 40.

In FIG. 7, the outer ring of the projection plane when parallel light parallel to the axial direction (X-axis direction) is applied to the fuselage section 10 is indicated by a large circle (corresponding to the maximum diameter of the fuselage section 10). Further, in FIG. 7, the outer ring of the projection plane when parallel light parallel to the axial direction (X-axis direction) is applied to the intake port 45 of the BLI propulsion section 40 is indicated by a small circle.

Further, in FIG. 7, a non-overlapping region where the projection plane of the fuselage section 10 and the projection plane of the intake port 45 of the BLI propulsion section 40 do not overlap with each other is shown in gray. Note that in the description here, the ratio of the downward offset of the intake port 45 of the BLI propulsion section 40 is defined as the ratio of the above-mentioned non-overlapping region (see the gray region).

Figure 8:
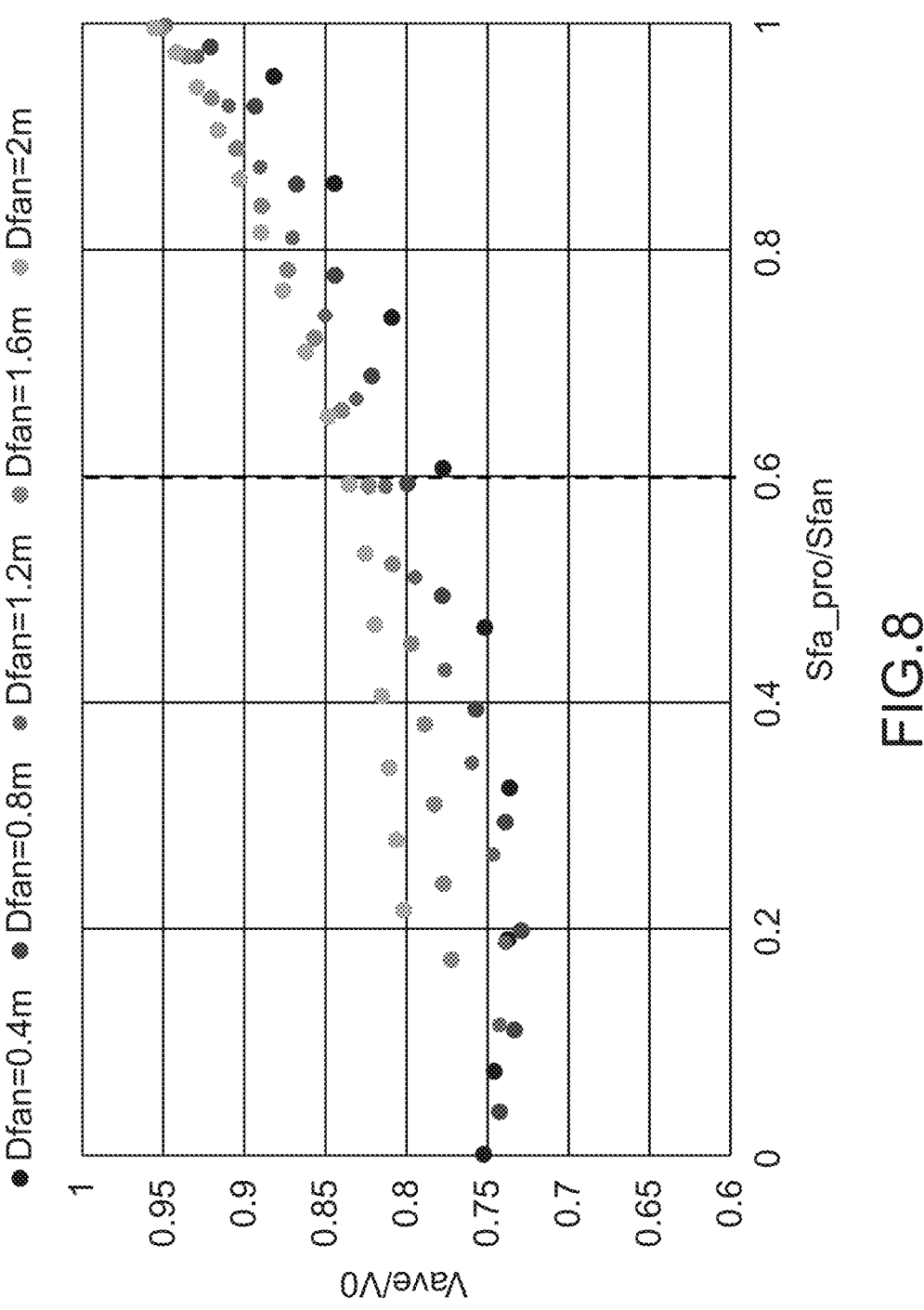
FIG. 8 is a diagram showing an average speed of airflow to the intake port in the case where the center position of the intake port in the BLI propulsion section is changed in the vertical direction and the area of a non-overlapping region is changed.

FIG. 8 is a diagram showing an average speed of airflow to the intake port 45 in the case where the center position of the intake port 45 in the BLI propulsion section 40 is changed in the vertical direction (Z-axis direction) and the area of the non-overlapping region is changed.

In FIG. 8, the horizontal axis indicates the ratio of an area Sfa_pro of the non-overlapping region with respect to an entire area Sfan in the projection plane of the intake port 45. That is, the value of 0 in the horizontal axis means that the non-overlapping region occupies 0%, and the value of 1 in the horizontal axis means that the non-overlapping region occupies 100%.

Further, in FIG. 8, the vertical axis indicates the average speed Vave of airflow taken in from the intake port 45 with reference to the speed V0 of the aircraft 100.

Further, FIG. 8 shows the results in the case where the diameter of the intake port 45 is changed in five patterns of 0.4 m, 0.8 m, 1.2 m, 1.6 m, and 2 m.

As shown in FIG. 8, the center position of the intake port 45 in the BLI propulsion section 40 is changed in the vertical direction (Z-axis direction) and the non-overlapping region between the projection plane of the fuselage section 10 and the projection plane of the intake port 45 is changed between 0% to 100%. Then, there is a tendency that as the ratio of the non-overlapping region increases, the average speed Vave/V0 of airflow taken in from the intake port 45 gradually increases. This tendency appears regardless of the diameter of the intake port 45.

Meanwhile, when the non-overlapping region between the projection plane of the fuselage section 10 and the projection plane of the intake port 45 of the BLI propulsion section 40 occupies less than 60% (as shown in FIG. 7), the average speed Vave/V0 of airflow taken in from the intake port 45 is appropriately reduced regardless of the diameter of the intake port 45.

For this reason, in this embodiment, the center position of the intake port 45 is caused to be downwardly offset such that the non-overlapping region between the projection plane of the fuselage section 10 and the projection plane of the intake port 45 occupies less than 60%. As a result, it is possible to generate thrust with high efficiency (energy efficiency, fuel consumption rate) in the BLI propulsion section 40.

<Shape of Intake Port 45>

Figure 9:
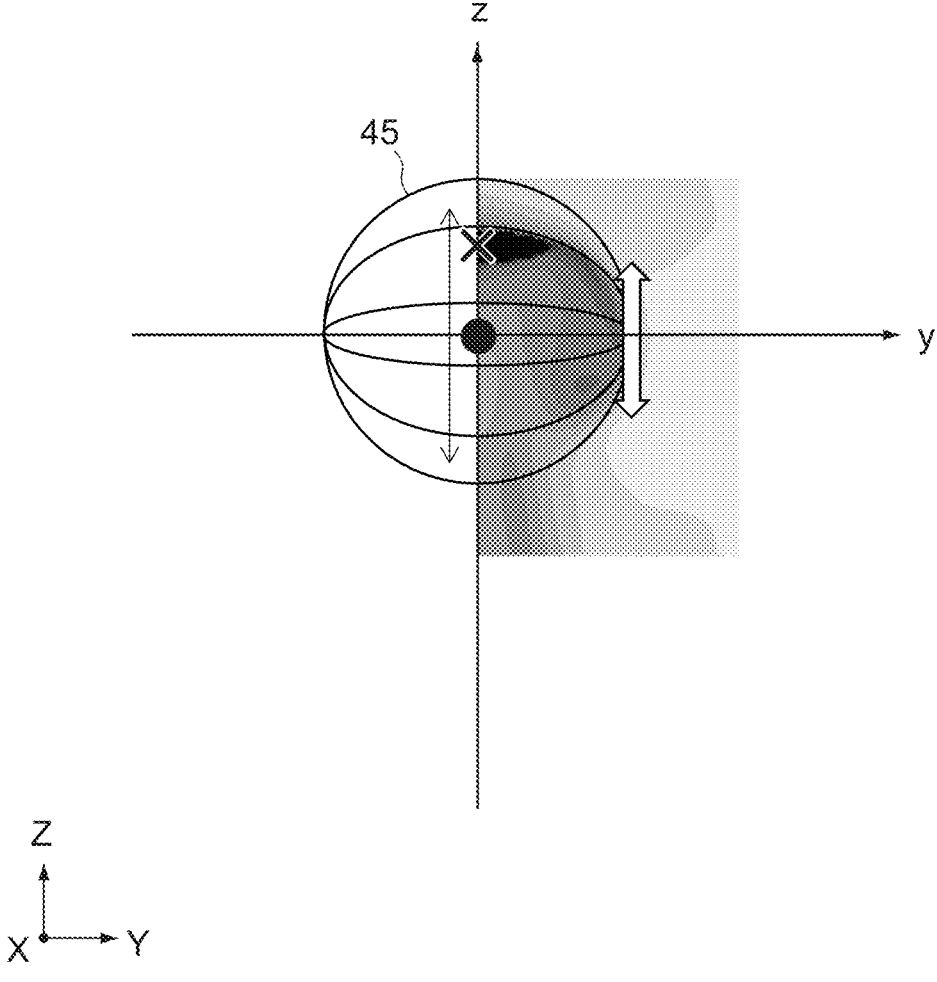
FIG. 9 is a diagram showing the state in the case where the shape of the intake port is changed to ellipses.

Next, the shape of the intake port 45 of the BLI propulsion section 40 will be described. FIG. 9 is a diagram showing the state in the case where the shape of the intake port 45 is changed to ellipses. In FIG. 9, the ellipse is represented by $(y/a)^n+(z/b)^n=1$, and the relationships of n=2 and a>b>0 are satisfied. Note that an ellipse is obtained in the case where n=2, and a superellipse is obtained in the case where n>2.

Note that the center position of the intake port 45 (see the black circle), i.e., the origin of the ellipse, is located below the center position of the rear end portion 11 (see the × mark) in the fuselage section 10 in the vertical direction, and is located at a position corresponding to the center position of the rear end portion 11 in the fuselage section 10 in the width direction.

Further, in FIG. 9, the y-axis corresponds to the width direction, and the z-axis corresponds to the vertical direction. Further, a represents the radius of the major axis (y-axis direction) of the ellipse, and b represent the radius of the minor axis (z-axis direction) of the ellipse.

Figure 10:
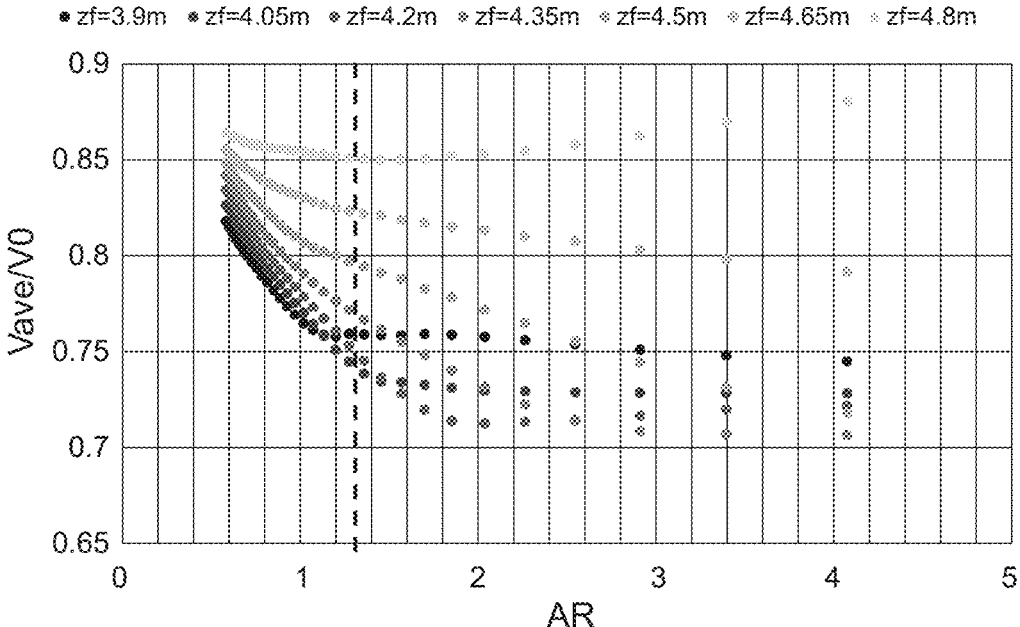
FIG. 10 is a diagram showing an average speed of airflow to the intake port in the case where the AR ratio of the intake port (ellipse) is changed.

FIG. 10 is a diagram showing an average speed of airflow to the intake port 45 in the case where the AR ratio of the intake port 45 (ellipse) is changed.

In FIG. 10, the horizontal axis represents the AR ratio (aspect ratio) of the intake port 45 (ellipse). The AR ratio is defined as $AR=(2a)^2/Sfan$, and indicates how laterally long the intake port 45 (ellipse) is. Note that 2a represents the length of the intake port 45 in the width direction (length of the major axis of the ellipse), and Sfan represents the area of the intake port 45 (YZ plane).

Further, in FIG. 10, the vertical axis indicates the average speed Vave of airflow taken in from the intake port 45 with reference to the speed V0 of the aircraft 100.

Further, FIG. 10 shows the results in the case where the center position of the intake port 45 is changed in seven patterns of 3.9 m, 4.05 m, 4.2 m, 4.35 m, 4.5 m, 4.65 m, and 4.8 m from the reference (1 m below the lowest point of the maximum diameter of the fuselage section 10) in the vertical direction (Z-axis direction).

Note that the center position of the intake port 45 is below the center position of the rear end portion 11 in the fuselage section 10 when the center position of the intake port 45 is in six patterns of 3.9 m, 4.05 m, 4.2 m, 4.35 m, 4.5 m, and 4.65 m from the reference (1 m below the lowest point of the maximum diameter of the fuselage section 10), which correspond to this embodiment. Meanwhile, the center position of the intake port 45 is above the center position of the rear end portion 11 in the fuselage section 10 when the center position of the intake port 45 is in the pattern of 4.8 m from the reference (1 m below the lowest point of the maximum diameter of the fuselage section 10), which corresponds to Comparative Example.

As shown in FIG. 10, when the AR ratio is changed between 0 to 5, the average speed Vave/V0 of airflow taken in from the intake port 45 gradually decreases as the AR ratio increases (the intake port 45 becomes laterally longer).

This tendency appears in the six patterns of 3.9 m, 4.05 m, 4.2 m, 4.35 m, 4.5 m, and 4.65 m from the reference (1 m below the lowest point of the maximum diameter of the fuselage section 10) of the center position of the intake port 45, which correspond to this embodiment. Meanwhile, in the pattern of 4.8 m from the reference (1 m below the lowest point of the maximum diameter of the fuselage section 10) of the center position of the intake port 45, which correspond to Comparative Example, there is a tendency that the average speed Vave/V0 of airflow taken in from the intake port 45 gradually increases as the AR ratio increases because the intake port 45 also sucks in fast airflow.

In FIG. 10, a broken vertical axis is shown at the position where the AR ratio is 1.3. In this embodiment, when the AR ratio is 1.3 or more, the average speed Vave/V0 of airflow taken in from the intake port 45 is appropriately reduced. As a result, it is possible to generate thrust with high efficiency (energy efficiency, fuel consumption rate) in the BLI propulsion section 40.

Figure 11:
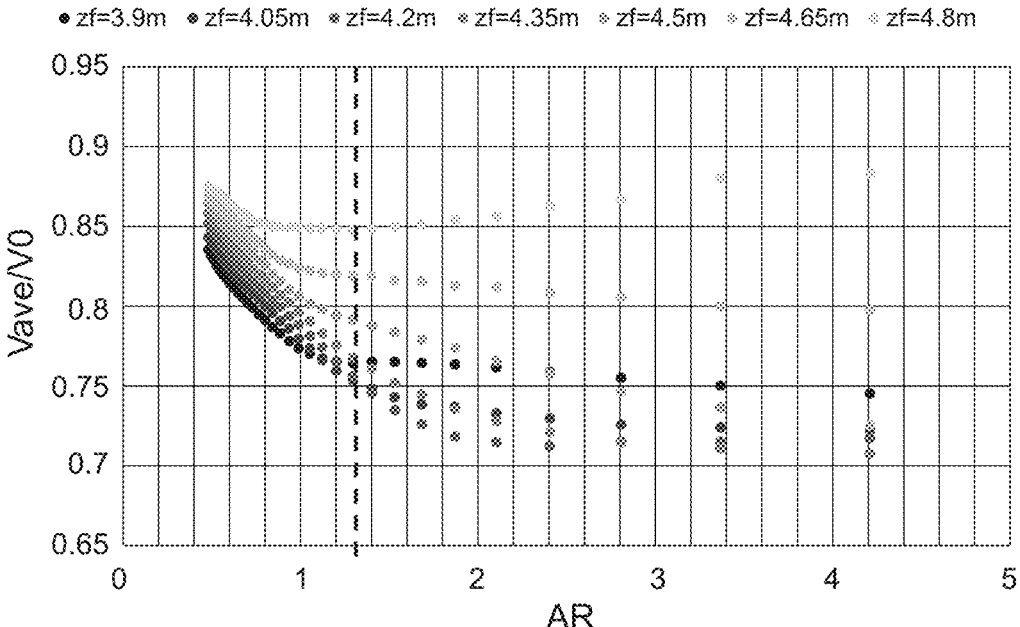
FIG. 11 is a diagram showing an average speed of airflow to the intake port in the case where the AR ratio of the intake port (superellipse) is changed.

FIG. 11 is a diagram showing an average speed of airflow to the intake port 45 in the case where the AR ratio of the intake port 45 (superellipse) is changed. In FIG. 11, the shape of the intake port 45 is a superellipse. Here, the ellipse is represented by $(y/a)^n+(z/b)^n=1$, and the relationships of n=5 and a>b>0 are satisfied.

In FIG. 11, the horizontal axis indicates the AR ratio (aspect ratio) of the intake port 45 (superellipse), and the vertical axis indicates the average speed Vave of airflow taken in from the intake port 45 with reference to the speed V0 of the aircraft 100.

Further, FIG. 11 shows the results in the case where the center position of the intake port 45 is changed in seven patterns of 3.9 m, 4.05 m, 4.2 m, 4.35 m, 4.5 m, 4.65 m, and 4.8 m from the reference (1 m below the lowest point of the maximum diameter of the fuselage section 10) in the vertical direction (Z-axis direction).

Note that the six patterns of 3.9 m, 4.05 m, 4.2 m, 4.35 m, 4.5 m, and 4.65 m from the reference (1 m below the lowest point of the maximum diameter of the fuselage section 10) of the center position of the intake port 45 correspond to this embodiment. Meanwhile, the pattern of 4.8 m from the reference (1 m below the lowest point of the maximum diameter of the fuselage section 10) of the center position of the intake port 45 corresponds to Comparative Example.

As shown in FIG. 11, when the AR ratio is changed between 0 to 5, the average speed Vave/V0 of airflow taken in from the intake port 45 gradually decreases as the AR ratio increases (the intake port 45 becomes laterally longer).

This tendency appears in the six patterns of 3.9 m, 4.05 m, 4.2 m, 4.35 m, 4.5 m, and 4.65 m from the reference (1 m below the lowest point of the maximum diameter of the fuselage section 10) of the center position of the intake port 45, which correspond to this embodiment. Meanwhile, in the pattern of 4.8 m from the reference (1 m below the lowest point of the maximum diameter of the fuselage section 10) of the center position of the intake port 45, which corresponds to Comparative Example, there is a tendency that the average speed Vave/V0 of airflow taken in from the intake port 45 gradually increases as the AR ratio increases because the intake port 45 also sucks in fast airflow.

In FIG. 11, a broken vertical axis is shown at the position where the AR ratio is 1.3. In this embodiment, when the AR ratio is 1.3 or more, the average speed Vave/V0 of airflow taken in from the intake port 45 is appropriately reduced. As a result, it is possible to generate thrust with high efficiency (energy efficiency, fuel consumption rate) in the BLI propulsion section 40.

Figure 12:
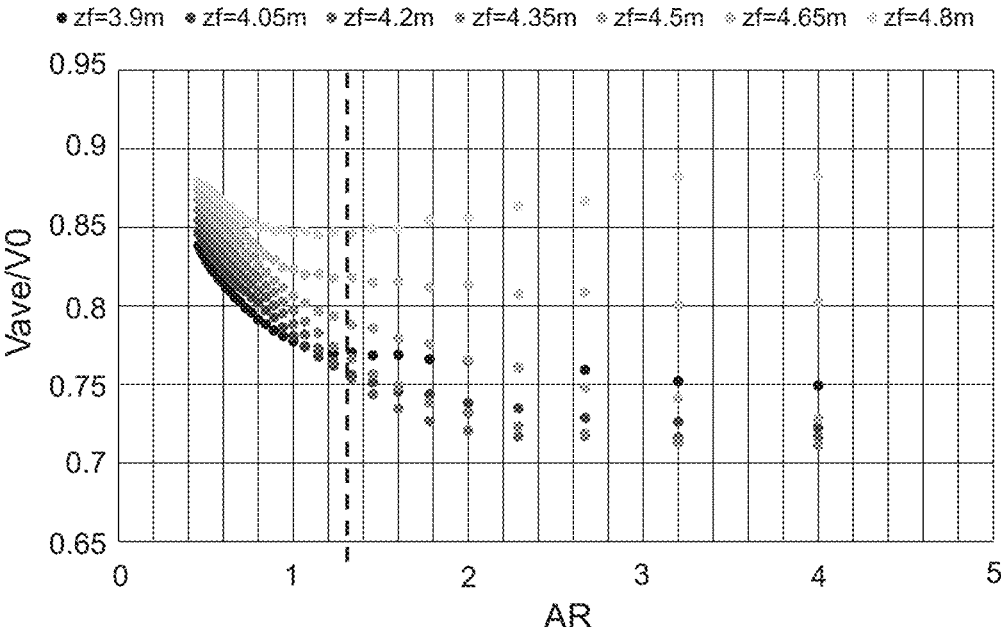
FIG. 12 is a diagram showing an average speed of airflow to the intake port in the case where the AR ratio of the intake port (rectangle) is changed.

FIG. 12 is a diagram showing an average speed of airflow to the intake port 45 in the case where the AR ratio of the intake port 45 (rectangle) is changed. In FIG. 12, the shape of the intake port 45 is a rectangle. Here, in the case where the shape of the intake port 45 is a rectangle, the AR ratio is defined as AR=(2a)$^2$/Sfan similarly to the cases of the ellipse and the superellipse, but the value of 2a means the length of the long side (y-axis direction) of the rectangle.

In FIG. 12, the horizontal axis indicates the AR ratio (aspect ratio) of the intake port 45 (rectangle), and the vertical axis indicates the average speed Vave of airflow taken in from the intake port 45 with reference to the speed V0 of the aircraft 100.

Further, FIG. 12 shows the results in the case where the center position of the intake port 45 (rectangle) is changed in seven patterns of 3.9 m, 4.05 m, 4.2 m, 4.35 m, 4.5 m, 4.65 m, and 4.8 m from the reference (1 m below the lowest point of the maximum diameter of the fuselage section 10) in the vertical direction (Z-axis direction).

Note that the six patterns of 3.9 m, 4.05 m, 4.2 m, 4.35 m, 4.5 m, and 4.65 m from the reference (1 m below the lowest point of the maximum diameter of the fuselage section 10) of the center position of the intake port 45 correspond to this embodiment. Meanwhile, the pattern of 4.8 m from the reference (1 m below the lowest point of the maximum diameter of the fuselage section 10) of the center position of the intake port 45 corresponds to Comparative Example.

As shown in FIG. 12, when the AR ratio is changed between 0 to 5, the average speed Vave/V0 of airflow taken in from the intake port 45 gradually decreases as the AR ratio increases (the intake port 45 becomes laterally longer).

This tendency appears in the six patterns of 3.9 m, 4.05 m, 4.2 m, 4.35 m, 4.5 m, and 4.65 m from the reference (1 m below the lowest point of the maximum diameter of the fuselage section 10) of the center position of the intake port 45, which correspond to this embodiment. Meanwhile, in the pattern of 4.8 m from the reference (1 m below the lowest point of the maximum diameter of the fuselage section 10) of the center position of the intake port 45, which corresponds to Comparative Example, there is a tendency that the average speed Vave/V0 of airflow taken in from the intake port 45 gradually increases as the AR ratio increases because the intake port 45 also sucks in fast airflow.

In FIG. 12, a broken vertical axis is shown at the position where the AR ratio is 1.3. In this embodiment, when the AR ratio is 1.3 or more, the average speed Vave/V0 of airflow taken in from the intake port 45 is appropriately reduced. As a result, it is possible to generate thrust with high efficiency (energy efficiency, fuel consumption rate) in the BLI propulsion section 40.

<Position and Rotation Direction of Impeller 42>

Figure 13:
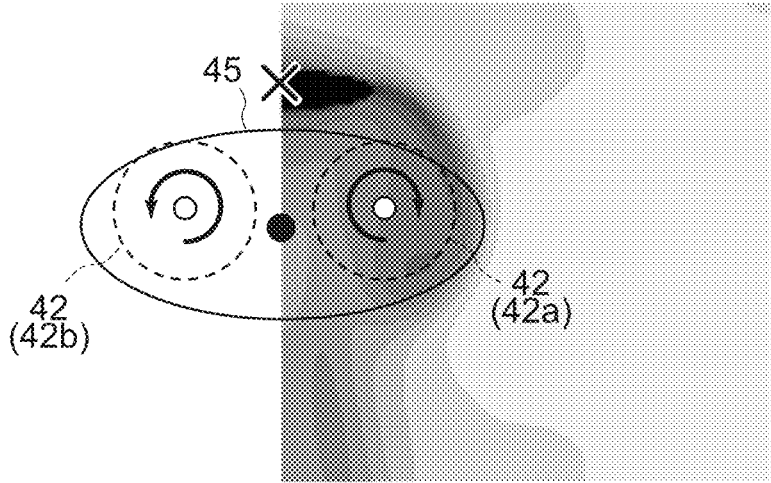
FIG. 13 is a diagram showing the position of an impeller with respect to the intake port and the rotation direction of the impeller, and is a diagram of the aircraft as viewed from the rear side.
Figure 13:
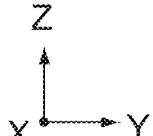

Next, the position of the impeller 42 with respect to the intake port 45 and the rotation direction of the impeller 42 will be described. FIG. 13 is a diagram showing the position of the impeller 42 with respect to the intake port 45 and the rotation direction of the impeller 42, and is a diagram of the aircraft 100 as viewed from the rear side.

In FIG. 13, the intake port 45 is shown in a solid line, and the impeller 42 is shown in a broken line. Further, the center position of the intake port 45 is shown by a black circle, and the central axis of the impeller 42 is shown by a white circle.

Here, since the BLI propulsion section 40 that sucks slow airflow from the intake port 45 blows out the airflow whose toral pressure has been increased by the impeller 42 to obtain thrust, higher efficiency can be achieved by the larger area (YZ plane) of the impeller 42.

Meanwhile, if the impeller 42 is unnecessarily enlarged to make the impeller 42 has a shape different from the shape of the intake port 45, the drag of the BLI propulsion section 40 including the nacelle 44 increases. In this case, since not only the fuel efficiency is impaired but also separation or the like occurs inside the BLI propulsion section 40, resulting in a decrease in efficiency, the impeller 42 desirably has a shape close to the shape of the intake port 45.

Figure 16:
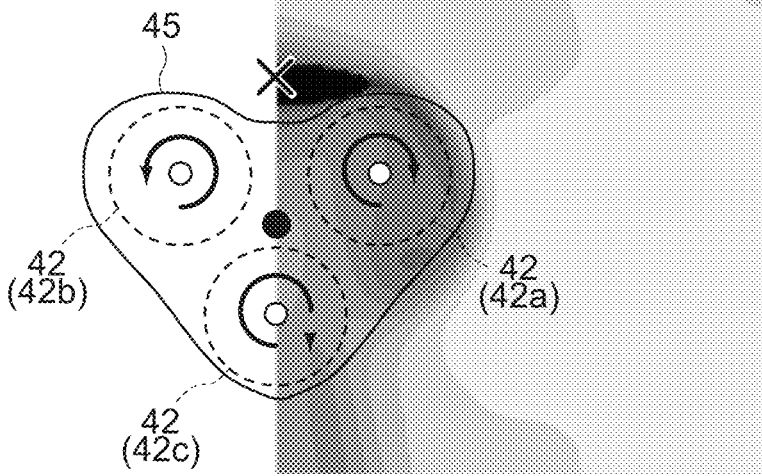
FIG. 16 is a diagram showing another example of the BLI propulsion section, and is a diagram of the BLI propulsion section as viewed from the rear.
Figure 16:
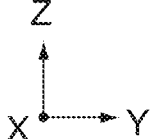

For this reason, in FIG. 13, the two impellers 42 are aligned along the width direction for the elliptical intake port 45 that has a high AR ratio and is laterally long (or, as shown in FIG. 16 described below, three impellers 42 are disposed in a V-shape for the intake port 45 having an inverted triangular shape).

As shown in FIG. 13, the BLI propulsion section 40 includes the two impellers 42. Note that in the description of FIG. 13, for convenience, the impeller 42 on the right side will be referred to as a first impeller 42*a*, and the impeller 42 on the left side will be referred to as a second impeller 42*b*.

The first impeller 42*a* and the second impeller 42*b* are disposed so as to be aligned along the width direction (Y-axis). Further, the central axes (see the white circles) of rotation of the first impeller 42*a* and the second impeller 42*b* are offset above the center position of the intake port 45 (see the black circle) in the vertical direction (Z-axis direction). Further, the central axes (see the white circles) of rotation of the first impeller 42*a* and the second impeller 42*b* are offset to the outside of the center position of the intake port 45 (see the black circle) in the width direction.

Further, the rotation directions of the first impeller 42*a* and the second impeller 42*b* are in opposite directions. Specifically, the first impeller 42*a* (on the right side) rotates clockwise (as viewed from the rear), and the second impeller 42*b* (on the left side) rotates counterclockwise (as viewed from the rear).

Here, the point that the central axes of rotation of the first impeller 42*a* and the second impeller 42*b* are offset from the center position of the intake port 45 in the vertical direction and the width direction and the point that the rotation directions of the first impeller 42*a* and the second impeller 42*b* are in opposite directions will be described.

Figure 14:
FIG. 14 is a diagram of airflow flowing near the surface of the airframe of the aircraft as viewed diagonally from the rear side of the aircraft.
Figure 14:
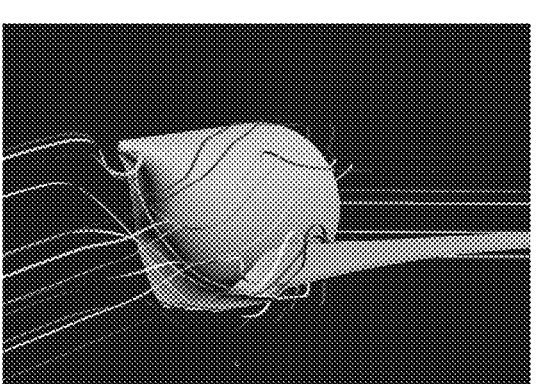

FIG. 14 is a diagram of airflow flowing near the surface of the airframe of the aircraft 100 as viewed diagonally from the rear side of the aircraft 100.

In FIG. 14, focus is placed on the region of the fuselage section 10 near the lower right of the rear end portion 11. In this region, the airflow flowing near the surface of the airframe flows toward the rear while rotating clockwise (as viewed from the rear) (inboard-up rotation). For this reason, in this embodiment, the first impeller 42*a* (on the right side) rotates clockwise in accordance with the rotation direction of the airflow (rotation direction corresponding to inboard-up rotation).

Meanwhile, although not shown, in the lower left region of the rear end portion 11 in the fuselage section 10, the airflow flowing near the surface of the airframe flows toward the rear while rotating counterclockwise (inboard-up rotation). For this reason, in this embodiment, the second impeller 42*b* (on the left side) rotates counterclockwise in accordance with this airflow (rotation direction corresponding to inboard-up rotation).

Further, the airflow flowing near the lower right of the rear end portion 11 of the fuselage section 10 rotates clockwise while winding up and flows into the right side of the intake port 45. In this regard, in this embodiment, the central axis of the first impeller 42*a* is located above the center position of the intake port 45 in the vertical direction and outside the center position of the intake port 45 in the width direction.

As a result, the first impeller 42*a* (on the right side) is capable of efficiently catching airflow flowing in clockwise while winding up, and thus, even more efficiently obtain thrust. Further, causing the first impeller 42*a* to rotate in a rotation direction corresponding to inboard-up rotation, it is possible to relax the airflow angle acting on the first impeller 42*a*. Further, since the torque required for the motor 43 that drives the first impeller 42*a* is reduced, it is possible to reduce the weight of the airframe of the aircraft 100, thereby further improving the fuel efficiency.

Similarly, the airflow flowing near the lower left of the rear end portion 11 of the fuselage section 10 rotates counterclockwise while winding up and flows into the left side of the intake port 45. In this regard, in this embodiment, the central axis of the second impeller 42*b* is located above the center position of the intake port 45 in the vertical direction and outside the center position of the intake port 45 in the width direction.

As a result, the second impeller 42*b* (on the left side) is capable of efficiently catching airflow flowing in counterclockwise while winding up, and thus, even more efficiently obtain thrust. Further, by causing the second impeller 42*b* to rotate in a rotation direction corresponding to inboard-up rotation, it is possible to relax the airflow angle acting on the second impeller 42*b*. Further, since the torque required for the motor 43 that drives the second impeller 42*b* is reduced, it is possible to reduce the weight of the airframe of the aircraft 100, thereby further improving the fuel efficiency.

In the description here, a case where the first impeller 42*a* and the second impeller 42*b* rotate in accordance with the rotation direction of airflow flowing in from the intake port 45 has been described. Meanwhile, the first impeller 42*a* (counterclockwise) and the second impeller 42*b* (clockwise) can also be caused to rotate in directions opposite to the rotational direction of airflow flowing in from the intake port 45.

In the description here, a case where one BLI propulsion device 41 includes two impellers 42 has been described. Meanwhile, the BLI propulsion section 40 may include two BLI propulsion devices 41, and the two BLI propulsion devices 41 may each include one impeller 42.

Figure 15:
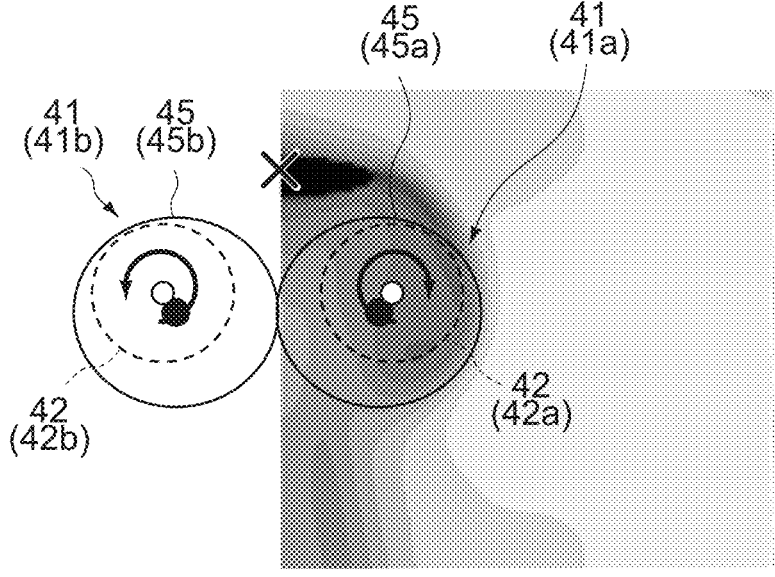
FIG. 15 is a diagram showing another example of the BLI propulsion section, and is a diagram of the BLI propulsion section as viewed from the rear.
Figure 15:
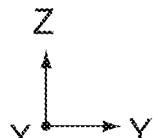

FIG. 15 is a diagram showing another example of the BLI propulsion section 40, and is a diagram of the BLI propulsion section 40 as viewed from the rear. The BLI propulsion section 40 includes two BLI propulsion devices 41 aligned along the width direction (Y-axis direction). A first BLI propulsion device 41*a* (on the right side) includes a first intake port 45*a* and the first impeller 42*a*. Similarly, a second BLI propulsion device 41*b* (on the left side) includes a second intake port 45*b* and the second impeller 42*b*.

The center position (black circle) of the first intake port 45*a* in the first BLI propulsion device 41*a* (on the right side) is offset below the center position of the rear end portion 11 of the fuselage section 10 (see the x mark) in the vertical direction and to the outside (right side) of the center position of the rear end portion 11 of the fuselage section 10 in the width direction.

Further, the center position (black circle) of the second intake port 45*b* in the second BLI propulsion device 41*b* (on the left side) is offset below the center position of the rear end portion 11 of the fuselage section 10 (see the x mark) in the vertical direction and to the outside (left side) of the center position of the rear end portion 11 of the fuselage section 10 in the width direction.

Also in the case shown in FIG. 14, the first impeller 42*a* (on the right side) is typically caused to rotate clockwise (inboard-up rotation), similarly to the case shown in FIG. 14. Further, the central axis (see the white circle) of rotation of the first impeller 42*a* is located above the center position (see the black circle) of the first intake port 45*a* in the vertical direction and outside the center position of the first intake port 45*a* in the width direction.

Similarly, the second impeller 42*b* (on the left side) is typically caused to rotate counterclockwise (inboard-up rotation). Further, the central axis (see the white circle) of rotation of the second impeller 42*b* is located above the center position (see the black circle) of the second intake port 45*b* in the vertical direction and outside the center position of the second intake port 45*b* in the width direction.

Here, the AR ratio of the entire intake port 45 including the first intake port 45*a* and the second intake port 45*b* will be described. In this case, the AR ratio of the entire intake port 45 is $AR=(2D^2)/(2\pi D^2/4)\approx2.55$, and the value 2.55 is the above 1.3 or more, D being the diameter of the circle indicating each of the first intake port 45*a* and the second intake port 45*b*. Therefore, the average speed of airflow taken in from the intake port 45 is appropriately reduced, and it is possible to generate thrust with high efficiency (energy efficiency, fuel consumption rate) in the BLI propulsion section 40.

That is, in the case where the BLI propulsion section 40 includes a plurality of intake ports 45, the AR ratio is obtained as the AR ratio of the entire intake port 45 including the plurality of intake ports, and the value thereof only needs to be 1.3 or more.

FIG. 16 is a diagram showing another example of the BLI propulsion section 40, and is a diagram of the aircraft 100 as viewed from the rear.

In the example shown in FIG. 16, the BLI propulsion section 40 includes one BLI propulsion device 41. The shape of the intake port 45 of this BLI propulsion device 41 is an inverted triangular shape (heart shape). Further, the center position of this intake port 45 is offset below the center position of the rear end portion 11 (see the x mark) in the fuselage section 10 in the vertical direction and is located at a position corresponding to the center position of the rear end portion 11 of the fuselage section 10 in the width direction.

In the description of FIG. 16, for convenience, the impeller 42 on the right side, the impeller 42 on the left side, and the impeller 42 on the lower side will be referred to as the first impeller 42*a*, the second impeller 42*b*, and a third impeller 42*c*, respectively. The first impeller 42*a* and the second impeller 42*b* are similar to those in FIG. 13.

The central axis (see the white circle) of rotation of the third impeller 42*c* is offset below the center position of the intake port 45 in the vertical direction and is located at a position corresponding to the center position of the intake port 45 in the width direction. The third impeller 42*c* may rotate clockwise or counterclockwise (as viewed from the rear).

Figure 17:
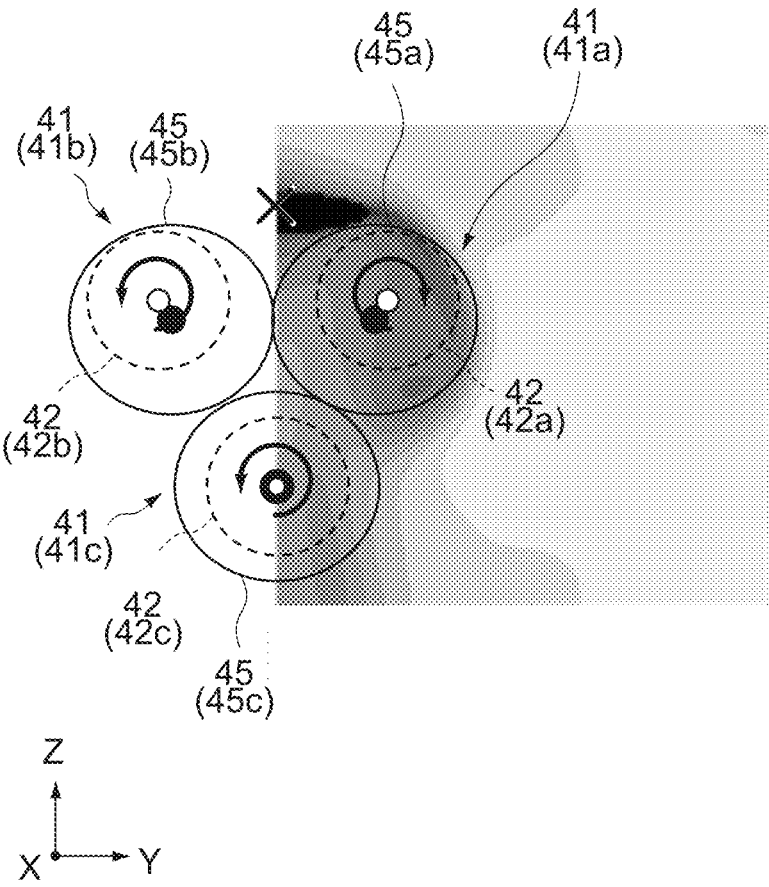
FIG. 17 is a diagram showing another example of the BLI propulsion section, and is a diagram of the BLI propulsion section as viewed from the rear.

FIG. 17 is a diagram showing another example of the BLI propulsion section 40, and is a diagram of the BLI propulsion section 40 as viewed from the rear. The BLI propulsion section 40 includes the first BLI propulsion device 41*a* (on the right side) and the second BLI propulsion device 41*b* (on the left side) aligned along the width direction (Y-axis direction), and a third BLI propulsion device 41*c* disposed below the first BLI propulsion device 41*a* and the second BLI propulsion device 41*b*.

The first BLI propulsion device 41*a* and the second BLI propulsion device 41*b* are similar to those in FIG. 15. The third BLI propulsion device 41*c* includes a third intake port 45*c* and the third impeller 42*c*. The center position (see the black circle) of the third intake port 45*c* is offset below the center position of the rear end portion 11 (see the × mark) in the fuselage section 10 in the vertical direction and is located at a position corresponding to the center position of the rear end portion 11 in the fuselage section 10 in the width direction.

The central axis (see the white circle) of rotation of the third impeller 42*c* matches the position of the center position (black circle) of the third intake port 45*c*. Note that the central axis of rotation of the third impeller 42*c* may be offset from the center position of the third intake port 45*c* in at least one of the vertical direction or the width direction. The third impeller 42*c* may rotate clockwise or counterclockwise (as viewed from the rear).

<Projected Shape of Fuselage Section 10 in Width Direction, Etc.>

Next, the shape of the projection plane when parallel light parallel to the width direction (Y-axis direction) is applied to the fuselage section 10, and the like will be described.

Figure 18:
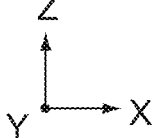
FIG. 18 is a diagram showing a projection plane when parallel light parallel to the width direction (Y-axis direction) is applied to the fuselage section.
Figure 19:
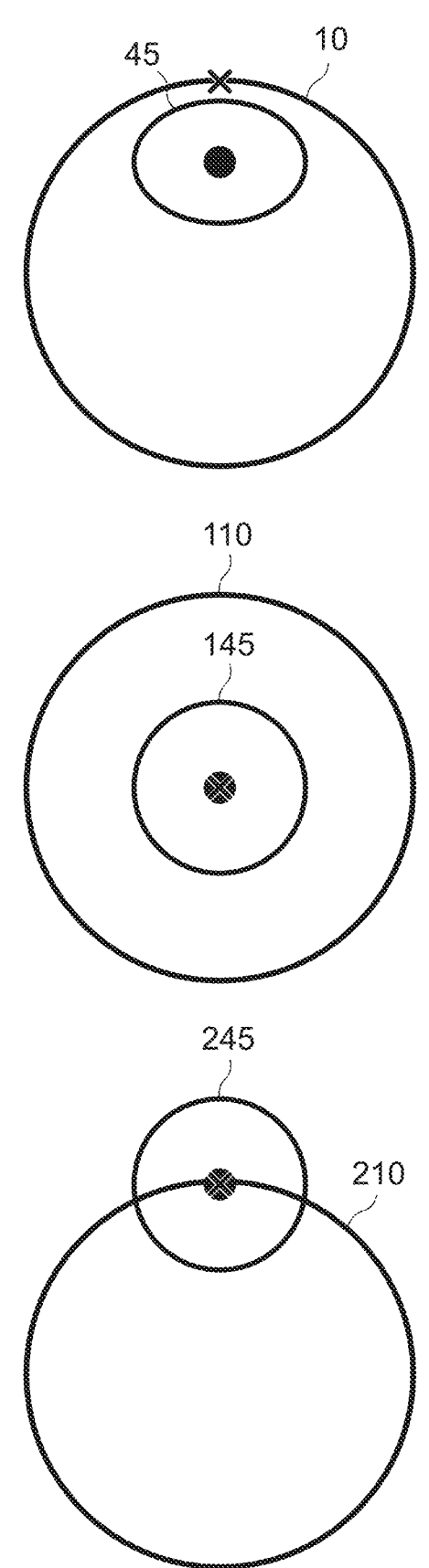
FIG. 19 is a diagram showing a projected view when parallel light parallel to the axial direction is applied to the fuselage section and the intake port.
Figure 19:

FIG. 18 is a diagram showing a projection plane when parallel light parallel to the width direction (Y-axis direction) is applied to the fuselage section 10. Note that in FIG. 18, in addition to the fuselage section 10, the BLI propulsion section 40 and the landing section 50 are shown. FIG. 19 is a diagram showing a projected view when parallel light parallel to the axial direction (X-axis direction) is applied to the fuselage section 10 and the intake port 45.

In FIG. 18 and FIG. 19, the top diagram shows the aircraft 100 according to this embodiment. Further, in FIG. 18 and FIG. 19, the center diagram shows an aircraft 101 according to First Comparative Example, and the bottom diagram shows an aircraft 102 according to Second Comparative Example.

With reference to the top diagrams of FIG. 18 and FIG. 19, in the aircraft 100 according to this embodiment, the fuselage section 10 is formed such that the lower side thereof on the rear side is cut diagonally upward and the diameter on the rear side gradually decreases toward the rear. Further, the center position of the rear end portion 11 of the fuselage section 10 is located near the upper end portion of the fuselage section 10 having the maximum diameter.

Further, in the aircraft 100 according to this embodiment, the center position of the intake port 45 of the BLI propulsion section 40 (see the black circle in FIG. 19) is offset below the center position of the rear end portion 11 of the fuselage section 10 (see the × mark in FIG. 19) in the vertical direction and is located at a position corresponding to the center position of the fuselage section 10 in the width direction.

With reference to the center diagrams of FIG. 18 and FIG. 19, in the aircraft 101 according to First Comparative Example, a fuselage section 110 is formed axially symmetrically with the central axis in the axial direction (X-axis direction) as the axis of symmetry, and is formed such that the diameter on the rear side gradually decreases toward the rear. Further, the center position of a rear end portion 111 of the fuselage section 110 substantially matches the center position of the fuselage section 110.

Further, in the aircraft 101 according to First Comparative Example, the center position (see the black circle in FIG. 19) of an intake port 145 of a BLI propulsion section 140 is located at a position corresponding to the center position (see the × mark in FIG. 19) of the rear end portion 111 of the fuselage section 110 in the vertical direction and the width direction.

With reference to the bottom diagrams of FIG. 18 and FIG. 19, in the aircraft 102 according to Second Comparative Example, a fuselage section 210 is formed such that the lower side thereof on the rear side is cut diagonally upward and the diameter on the rear side gradually decreases toward the rear. Further, the center position of a rear end portion 211 of the fuselage section 210 is located near the upper end portion of the fuselage section 210 having the maximum diameter.

Further, in the aircraft 102 according to Second Comparative Example, the center position (see the black circle in FIG. 19) of an intake port 245 of a BLI propulsion section 240 is located at a position corresponding to the center position (see the × mark in FIG. 19) of the rear end portion 211 of the fuselage section 210 in the vertical direction and the width direction.

In FIG. 18, the ground planes of the landing sections 50, 150, and 250 in the aircrafts 100, 101, and 102 are represented by dot-dash lines, and the tail scrape angles relative to the ground planes required during takeoff are shown by solid lines. Further, in FIG. 18, straight lines connecting the ground contact points of the landing sections 50, 150, and 250 of the aircrafts 100, 101, and 102 and the lowest points of the BLI propulsion sections 40, 140, and 240 are shown by dotted lines.

The tail scrape angle is an angle required to inhibit the rear side of the airframe from scraping the ground when the aircrafts 100, 101, and 102 take off, and is set to 10.5° with respect to the ground plane in this example.

In First Comparative Example and Second Comparative Example, the straight lines connecting the ground contact points of the landing sections 150 and 250 of the aircrafts 101 and 102 and the lowest points of the BLI propulsion sections 140 and 240 match the straight line indicating the tail scrape angle, and thus, they are inclined at an angle of 10.5° with respect to the axial direction (X-axis direction).

On the other hand, in this embodiment, the straight line connecting the ground contact point of the landing section 50 of the aircraft 100 and the lowest point of the BLI propulsion section 40 is above the straight line indicating the tail scrape angle, and thus, it is inclined at an angle exceeding 10.5° with respect to the axial direction (X-axis direction).

Here, with reference to the top diagram of FIG. 18, focus is placed on the lower curve on the rear side of the projection plane in the width direction of the fuselage section 10 regarding the aircraft 100 according to this embodiment. This curve is cut diagonally upward at an angle steeper than those in First Comparative Example and Second Comparative Example. Further, this curve is a curve that is twice differentiable and has an inflection point.

In the top diagram of FIG. 18, an asterisk is attached to the inflection point where this curve changes from convex downward to convex upward. In this embodiment, the BLI propulsion section 40 (intake port 45) is disposed at a position where the lower side of the fuselage section 10 is recessed, which is behind the inflection point.

Here, in the case where the shape of the aircraft is a shape as those in First Comparative Example and Second Comparative Example, the positions of the BLI propulsion sections 140 and 240 factors that determine the tail scrape angle. Therefore, it is necessary to increase the sizes of the landing sections 150 and 250 of the aircrafts 101 and 102 in order to provide the tail scrape angle of 10.5° at the time of takeoff in First Comparative Example and Second Comparative Example.

Since the ratio of the weight of the landing section 50 to the weight of the entire aircraft 100 is relatively large, the weight of the entire aircraft 100 increases when the landing section 50 becomes large and heavy, resulting a decrease in fuel efficiency.

On the other hand, in this embodiment, the BLI propulsion section 40 is disposed in the recessed portion on the rear side of the inflection point, and the straight line connecting the ground contact point of the landing section 50 of the aircraft 100 and the lowest point of the BLI propulsion section 40 is above the straight line indicating the tail scrape angle. As a result, it is possible to appropriately provide a tail scrape angle of 10.5° or more even without increasing the size of the landing section 50 and inhibit the fuel efficiency of the aircraft 100 from decreasing.

Further, in this embodiment, since slow airflow on the rear side of the fuselage section 10 can be suck in from the intake port 45 and a tail scrape angle of 10.5° or more can be appropriately provided, it is possible to achieve both high propulsion performance and high takeoff performance. In particular, by providing the position of the intake port 45 of the BLI propulsion section 40 behind the inflection point in the axial direction (X-axis direction), it is possible to guide the decelerated airflow to the intake port 45 more effectively and further improve propulsion efficiency.

Here, in this embodiment, the portion of the BLI propulsion section 40 corresponding to the center position of the intake port 45 (e.g., the core portion of the nacelle central portion including a fan hub, a motor, and the like) is not joined to the fuselage section (top in FIG. 18). Meanwhile, in First Comparative Example and Second Comparative Example, the portions of the BLI propulsion sections 140 and 240 corresponding to the center positions of the intake ports 145 and 245 (e.g., the core portion of the nacelle central portion including a fan hub, a motor, and the like) are joined to the fuselage section (center and bottom in FIG. 18).

Therefore, in First Comparative Example and Second Comparative Example, since the configuration in which relatively fast airflow flowing on the upper side of the airframes of the aircrafts 101 and 102 is taken in from the intake ports 145 and 245 is adopted, the propulsion efficiency is poor. Further, in First Comparative Example and Second Comparative Example, the impellers of the BLI propulsion sections 140 and 240 receive high-speed airflow during the rotational phase on the upper side of the fuselage sections 110 and 120 and low-speed airflow during the rotational phase on the lower side of the fuselage sections 110 and 120. Therefore, the impellers of the BLI propulsion sections 140 and 240 are subjected to sever cyclic loads, thereby inducing a fatigue failure.

On the other hand, in this embodiment, the center position of the intake port 45 is offset below the center position of the rear end portion of the fuselage section 10 and the portion of the BLI propulsion section 40 corresponding to the center position of the intake port 45 (the core portion of the nacelle central portion) is not joined to the fuselage section 10. Therefore, high-speed airflow from the upper part of the fuselage section 10 is difficult to enter the intake port 40, and thus, it is possible to inhibit the fatigue failure as described above while improving propulsion efficiency.

Figure 20:
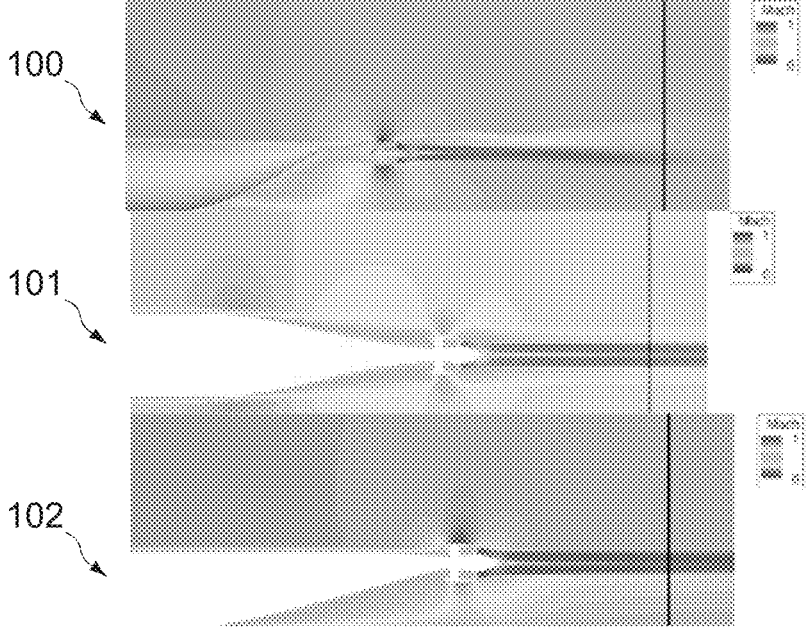
FIG. 20 is a diagram showing a speed of airflow when airflow is sucked into the BLI propulsion section and accelerated and discharged backwards.

FIG. 20 is a diagram showing a speed of airflow when airflow is sucked into the BLI propulsion section 40 and accelerated and discharged backwards. In FIG. 20, the top diagram shows the aircraft 100 according to this embodiment, the center diagram shows the aircraft 101 according to First Comparative Example, and the bottom diagram shows the aircraft 102 according to Second Comparative Example.

As shown in FIG. 20, in First Comparative Example and Second Comparative Example, although relatively slow airflow on the rear side of the fuselage sections 110 and 210 is taken in from the intake ports 145 and 245, the speed of the airflow to be taken in is faster than that in this embodiment. Therefore, the propulsion performance in First Comparative Example and Second Comparative Example is lower than that in this embodiment.

On the other hand, in this embodiment, relatively slow airflow on the rear side of the fuselage section 10 is taken in from the intake port 45, and the speed of airflow to be taken in is slower than those in First Comparative Example and Second Comparative Example. Therefore, the propulsion performance in this embodiment is higher than those in First Comparative Example and Second Comparative Example.

That is, in the BLI technology according to this embodiment, it is possible to obtain thrust by efficiently sucking in slow airflow generated on the rear side of the airframe due to interference with not only the surface of the airframe but also the respective potions of the airframe (see FIG. 5, FIG. 14, and the like) by the BLI propulsion section 40. Therefore, the BLI propulsion section according to this embodiment is capable of achieving propulsion efficiency higher than those of the BLI propulsion sections 140 and 240 according to First Comparative Example and Second Comparative Example.

<how Far Back the Intake Port 45 is Disposed in the Axial Direction (X-Axis Direction)>

Next, how far back the intake port 45 in the BLI propulsion section 40 is disposed in the axial direction (X-axis direction) with respect to the fuselage section 10 will be described.

In this embodiment, the position of the intake port 45 in the axial direction is located behind any one of the following three points.

(1) Behind the above inflection point in the axial direction (2) Behind the position where the width of the fuselage section 10 (Y-axis direction) is 50% of the maximum value of the width of the fuselage section 10 in the axial direction (indicated by dashed line A in FIG. 1)

(3) Behind the position where the cross-sectional area perpendicular to the axial direction (X-axis direction) in the fuselage section 10 is 25% of the maximum value of the cross-sectional area in the axial direction (indicated by dashed line B in FIG. 1).

Figure 21:
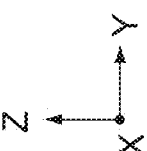
FIG. 21 is a diagram showing the width of a fuselage section 10 at a certain point in the axial direction with reference to the maximum value of the width of the fuselage section, and the area of the fuselage section at a certain point in the axial direction with reference to the maximum value of the cross-sectional area of the fuselage section.

Since (1) is as described above, (2) and (3) will be described. FIG. 21 is a diagram showing the width of the fuselage section 10 at a certain point in the axial direction with reference to the maximum value of the width of the fuselage section 10 and the area of the fuselage section 10 at a certain point in the axial direction with reference to the maximum value of the cross-sectional area of the fuselage section 10.

In FIG. 21, regions filled with black indicate the cross section (YZ plane) perpendicular to the axial direction in the fuselage section 10, and white circles indicate the intake port 45 of the BLI propulsion section 40.

In each diagram in FIG. 21, the position of the axial direction (X-axis direction) is changed and the position of the tip portion of the fuselage section 10 is set to x=0. Further, in FIG. 21, the speed of airflow flowing near the surface of the fuselage section 10 is shown in gray scale (the darker the black, the slower the airflow is).

As shown in FIG. 21, by shifting the position of the intake port 45 toward the rear in the axial direction, it becomes possible to gradually suck in slow airflow from the intake port 45 appropriately. Here, focus is placed on the diagram on the right side of the second row from the top of FIG. 21 and the diagram on the left side of the bottom row of FIG. 21.

The diagram on the right side of the second row from the top of FIG. 21 indicates the cross-sectional area of the fuselage section 10 at a point 30 m from the tip portion of the fuselage section 10. Further, at the point 30 m from the tip portion of the fuselage section 10, the width of the fuselage section 10 is 57% of the maximum width of the fuselage section 10 and the cross-sectional area of the fuselage section 10 is 32% of the maximum area of the fuselage section 10. In the case where the intake port 45 is disposed at this point, slow airflow (dark gray portion) cannot be very efficiently taken in.

Meanwhile, the diagram on the left side of the bottom row of FIG. 21 indicates the cross-sectional area of the fuselage section 10 at a point 31 m from the tip portion of the fuselage section 10. Further, at the point 31 m from the tip portion of the fuselage section 10, the width of the fuselage section 10 is 49% of the maximum width of the fuselage section 10 and the cross-sectional area of the fuselage section 10 is 20% of the maximum area of the fuselage section 10. In the case where the intake port 45 is disposed at this point, slow airflow can be efficiently taken in.

In this regard, in this embodiment, the intake port 45 is provided behind the position where the width of the fuselage section 10 (Y-axis direction) is 50% of the maximum value of the width of the fuselage section 10 in the axial direction. Alternatively, the intake port 45 is provided behind the position where the cross-sectional area perpendicular to the axial direction (X-axis direction) in the fuselage section 10 is 25% of the maximum value of the cross-sectional area in the axial direction. As a result, it is possible to efficiently take in slow airflow from the intake port 45 and generate thrust with high efficiency (energy efficiency, fuel consumption rate) in the BLI propulsion section 40.

<Others>

The BLI propulsion section 40 is capable of achieving higher propulsion efficiency than the main engine section 30 installed below the main wing section 20, for example.

Therefore, it is possible to increase propulsion efficiency by increasing the ratio of thrust of the BLI propulsion section 40 to thrust of the entire aircraft 100.

Meanwhile, when the ratio of thrust of the BLI propulsion section 40 is increased, the weight of the electric propulsion system including the generator 37, the convertor 2, the inverter 3, the motor 43, the power wire, and the like shown in FIG. 4 increases, and the fuel efficiency of the entire aircraft 100 is impaired. Further, since the power of the engine shaft 38 during takeoff is less than that during cruising, the extracted torque can be increased in the BLI propulsion section 40 during takeoff, which needs to increase enlarge the electronic parts of the generator 37 to corresponding sizes. Meanwhile, since such a large extracted torque is not required during cruising, the weight of each of the enlarged electronic parts of the generator 37 becomes a dead weight during cruising.

On the other hand, in this embodiment, the extracted torque during takeoff is set to match an extracted torque corresponding to the ratio of thrust that maximizes the fuel efficiency of the entire aircraft 100 during cruising. That is, the generator 37 is configured such that the extracted torque can be maintained at 100% to 90% of the maximum torque of the generator 37 during both takeoff and cruising. As a result, it is possible to ensure an operation during cruising while inhibiting the above dead weight from increasing.

Further, in this embodiment, since the power of the motor 43 of the BLI propulsion section 40 is extracted from the engine shaft 38 of the main engine section 30, there is a possibility that in the case where an error has occurred in the above electric propulsion system, the BLI propulsion section 40 does not generate thrust even though power is extracted from the main engine section 30. In this case, if one of the main engines 31 and 32 stops during takeoff, there is a risk that the aircraft 100 crashes due to insufficient thrust.

In this regard, in this embodiment, in the case where an altitude H and a speed V of the aircraft 100 are in predetermined ranges, the power (electric power) to be extracted from the main engine section 30 by the BLI propulsion section 40 is limited to a predetermined value (zero, or a value at which the BLI propulsion section 40 does not generate drag on the main engine section 30) or less.

Figure 22:
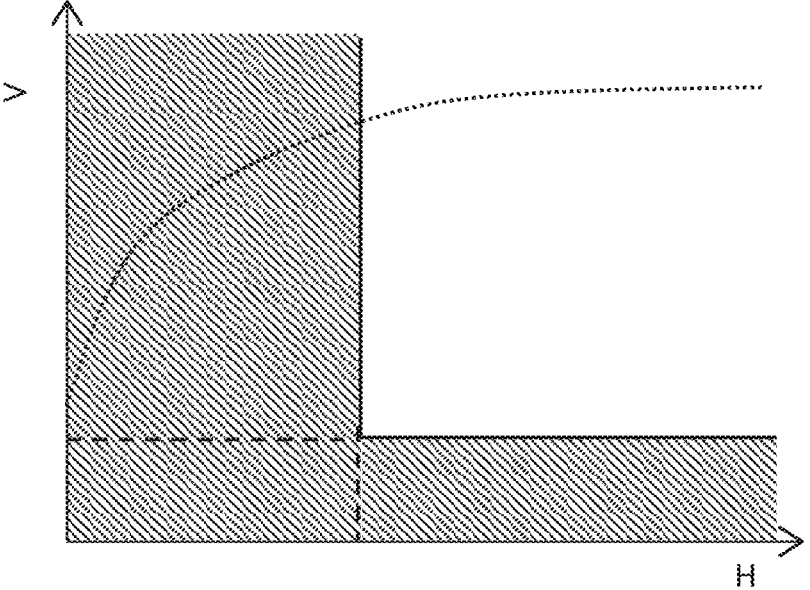
FIG. 22 is a diagram showing a range in which the power extracted from the main engine section by the BLI propulsion section is set to a predetermined value or less.

FIG. 22 is a diagram showing a range (see the gray portion) in which the power to be extracted from the main engine section 30 by the BLI propulsion section 40 is set to the predetermined value (zero, or a value at which the BLI propulsion section 40 does not generate drag) or less. Note that the trajectory of the speed and altitude of the aircraft 100 during takeoff is shown by a dotted curve.

As shown in FIG. 22, in the case where at least one of the condition that the altitude H of the aircraft 100 is a predetermined altitude or less or the condition that the speed V is a predetermined speed or less is satisfied, the power to be extracted from the main engines 31 and 32 by the BLI propulsion section 40 is set to the predetermined value (zero, or a value at which the BLI propulsion section 40 does not generate drag) or less.

Further, the power to be extracted from the main engines 31 and 32 by the BLI propulsion section 40 may be limited to the predetermined value (zero, or a value at which the BLI propulsion section 40 does not generate drag) or less in the case where the condition that at least one of the plurality of main engines 31 and 32 has stopped is satisfied in addition to the condition that the at least one of the two conditions is satisfied.

As a result, it is possible to reduce the probability of failure of the electric propulsion system when one of the main engines 31 and 32 stops and ensure the reliability of the aircraft 100.

Further, when the aircraft 100 descends, the thrust or rotation speed of the main engine section 30 can be lowered to be close to those during idling. At this time, if the BLI propulsion section 40 extracts power from the engine shaft 38, there is a possibility that the engine will stop due to slight fluctuations in the extracted power.

In this regard, in this embodiment, in the case where a rotation speed N1 of the engine shaft 38 of the main engine section 30 is 60% or less of the maximum rotation speed of the engine shaft 38 (value determined in accordance with the flight altitude), an extracted torque τgen to be extracted from the generator 37 by the BLI propulsion section 40 is limited to 10% or less.

Alternatively, in the case where the engine output of the main engine section 30 is below 60% of the maximum value of the engine output (value determined in accordance with the flight altitude), the extracted torque τgen extracted from the generator 37 by the BLI propulsion section 40 is limited to 10%.

Figure 23:
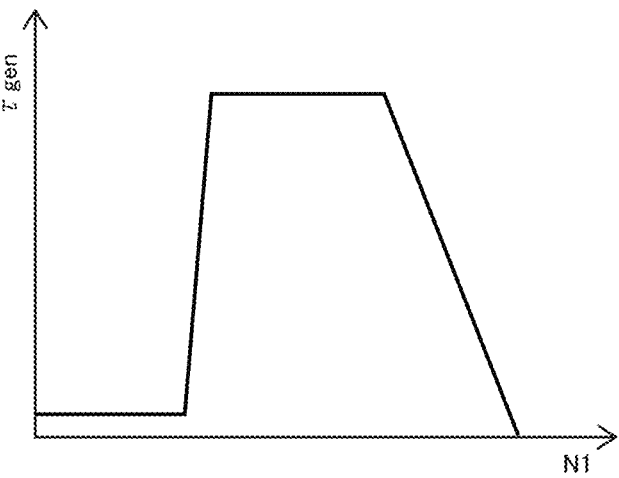
FIG. 23 is a diagram showing a relationship between the rotation speed of an engine shaft of the main engine section and the extracted torque extracted from a generator by the BLI propulsion section.

FIG. 23 is a diagram showing a relationship between the rotation speed N1 of the engine shaft 38 of the main engine section 30 and the extracted torque τgen extracted from the generator 37 by the BLI propulsion section 40. As shown in FIG. 23, when the rotation speed N1 of the engine shaft 38 of the main engine section 30 is 60% or less of the maximum rotation speed of the engine shaft 38, the extracted torque τgen extracted from the generator 37 by the BLI propulsion section 40 is limited to 10% or less of the maximum value of the extracted torque. As a result, for example, it is possible to solve the problem that the main engine section 30 suddenly stops during descent.

Figure 24:
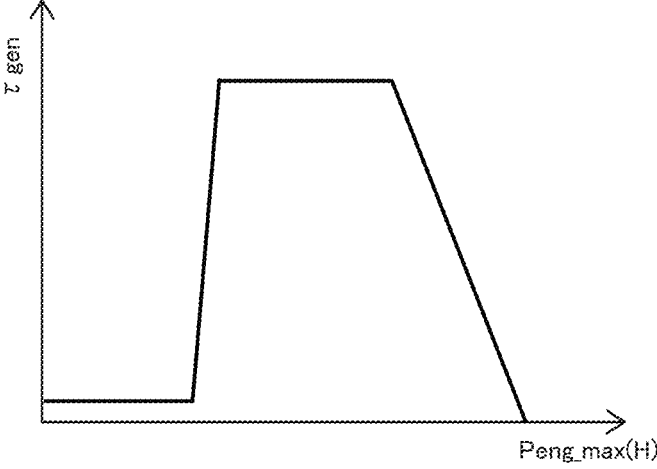
FIG. 24 is a diagram showing a relationship between the engine output of the main engine section and the extracted torque extracted from the generator by the BLI propulsion section.

FIG. 24 is a diagram showing a relationship between the engine output of the main engine section 30 and the extracted torque τgen extracted from the generator 37 by the BLI propulsion section 40. As shown in FIG. 24, when the engine output of the main engine section 30 is 60% or less of the maximum value of the engine output (value determined in accordance with the flight altitude), the extracted torque τgen extracted from the generator 37 by the BLI propulsion section 40 is limited to 10% or less of the maximum value of the extracted torque. As a result, it is possible to solve the problem that the main engine section 30 suddenly stops during descent.

Effects, Etc.

As described above, in this embodiment, the center position of the intake port 45 of the BLI propulsion section 40 is offset below the center position of the rear end portion 11 of the fuselage section 10 in the vertical direction. As a result, it is possible to appropriately reduce the average speed of airflow taken in from the intake port 45, and thus, generate thrust with high efficiency (energy efficiency, fuel consumption rate) in the BLI propulsion section 40.

Further, in this embodiment, the fuselage section 10 has a shape in which the outer diameter gradually decreases toward the rear end portion 11 on the rear side of the fuselage section 10, and the center position of the rear end portion 11 of the fuselage section 10 is above the center position of the fuselage section 10 in the vertical direction. Then, in this embodiment, the center position of the intake port 45 of the BLI propulsion section 40 is located between the center position of the fuselage section 10 and the center position of the rear end portion 11 in the vertical direction. As a result, it is even more efficiently generate thrust in the BLI propulsion section 40.

Here, the shape of the projection plane of the fuselage section 10 according to this embodiment in the width direction is a shape in which the lower side of the fuselage section 10 on the rear side is cut diagonally upward. For this reason, in this embodiment, the region below the center position of the rear end portion 11 of the fuselage section 10 is a region through which slow airflow flows. Meanwhile, there is a possibility that the region through which slow airflow flows differs depending on the shape of the airframe of the aircraft 100. For example, there is a possibility that the region through which slow airflow flows is a region above, below, on the right side, or on the left side of the center position of the rear end portion 11 of the fuselage section 10 depending on the shape of the aircraft 100.

Therefore, it only needs to analyze the position of the region through which slow airflow flows as viewed from the center position of the rear end portion 11 of the fuselage section 10, in accordance with the shape of the aircraft 100, and determine, in accordance therewith, the direction (YZ direction) in which the center position of the intake port 45 is offset. That is, typically, the center position of the intake port 45 of the BLI propulsion section 40 only needs to be offset from the center position of the rear end portion 11 of the fuselage section 10 in at least one of the vertical direction or the width direction.

Note that, for example, in the case where the first BLI propulsion device 41a and the second BLI propulsion device 41b are aligned in the width direction as shown in FIG. 15, the center positions (see the black circles) the first intake port 45a of the first BLI propulsion device 41a and the second intake port 45b of the second BLI propulsion device 41b are offset from the center position of the rear end portion 11 of the fuselage section 10 (see the × mark) in both the vertical direction and the width direction.

Further, in this embodiment, the area of the non-overlapping region where the projection plane when parallel light parallel to the axial direction (X-axis direction) is applied to the fuselage section 10 and the projection plane when parallel light is applied to the intake port 45 do not overlap with each other occupies less than 60% (the ratio at which the center position of the intake port 45 is downwardly offset). As a result, it is possible to appropriately take in slow airflow from the intake port 45 and even more efficiently generate thrust in the BLI propulsion section 40.

Further, in this embodiment, the value of AR (aspect ratio) is 1.3 or more, AR being represented by $(2a)^2/Sfan$, 2a being the length of the intake port 45 of the BLI propulsion section 40 in the width direction, Sfan being the area of the intake port 45 (how laterally long the intake port 45 is). As a result, it is possible to appropriately take in slow airflow from the intake port 45 and even more efficiently generate thrust in the BLI propulsion section 40.

Further, in this embodiment, in the case where the BLI propulsion section 40 includes the first impeller 42a and the second impeller 42b aligned in the width direction, the rotation directions of the first impeller 42a and the second impeller 42b are in opposite directions, and the rotation directions of the first impeller 42a and the second impeller 42b are each a rotation direction corresponding to inboard-up rotation. As a result, the torque required for the motor 43 that drives the first impeller 42a and the second impeller 42b is reduced, and thus, it is possible to reduce the weight of the airframe of the aircraft 100, thereby further improving the fuel efficiency.

Further, in this embodiment, the first impeller 42a and the second impeller 42b have the central axis of rotation located above the center position of the intake port 45 in the vertical direction and outside the center position of the intake port 45 in the width direction. As a result, the first impeller 42a and the second impeller 42b are capable of efficiently capturing airflow flowing into the intake port 45 while winding up, and thus, it is possible to even more efficiently obtain thrust in the BLI propulsion section 40.

Further, in this embodiment, an angle formed between the axial direction (X-axis direction) and a tangent connecting a ground contact point of the landing section 50 and the lowest point of the BLI propulsion section 40 in the shape of the projection plane when parallel light parallel to the width direction is applied to the fuselage section 10 and the landing section 50 exceeds 10.5°. As a result, it is possible to achieve both high propulsion performance and high takeoff performance.

Further, in this embodiment, the shape of a curve indicating the lower side on the rear side of the fuselage section 10 in the shape of the projection plane when parallel light parallel to the width direction is applied to the fuselage section 10 is a shape that is twice differentiable and has an inflection point, and the intake port 45 is disposed behind the inflection point in the axial direction (X-axis direction). As a result, it is possible to achieve both high propulsion performance and high takeoff performance.

Further, in this embodiment, the intake port 45 of the BLI propulsion section 40 is disposed behind a position where the width of the fuselage section 10 is 50% of the maximum value of the width of the fuselage section 10 in the axial direction (X-axis direction). As a result, it is possible to efficiently take in slow airflow from the intake port 45 and efficiently generate thrust in the BLI propulsion section 40.

Further, in this embodiment, the intake port 45 of the BLI propulsion section 40 is disposed behind a position where the cross-sectional area perpendicular to the axial direction in the fuselage section 10 is 25% of the maximum value of the cross-sectional area in the axial direction. As a result, it is possible to efficiently take in slow airflow from the intake port 45, efficiently generate thrust in the BLI propulsion section 40.

Further, in this embodiment, regarding the cross sections of the fuselage section 10 and the intake port 45 in the direction perpendicular to the axial direction (X-axis direction) at the position where the intake port 45 is provided in the axial direction, the cross section of the fuselage section 10 and the cross section of the intake port 45 do not overlap with each other. As a result, it is possible to even more efficiently generate thrust in the BLI propulsion section 40.

Further, in this embodiment, the generator 37 of the main engine section 30 is operated at the extracted torque of 100% or less and 90% or more of the maximum torque of the generator 37 regardless of the operating state of the aircraft 100 (during takeoff, during cruising, etc.). As a result, it is possible to ensure an operation during cruising while inhibiting the dead weight from increasing.

Further, in this embodiment, in the case where at least one of a condition that power extracted from the generator 37 is limited to a predetermined value or less in a case where at least one of the condition that the altitude of the aircraft 100 is a predetermined altitude or less or the condition that speed of the aircraft 100 is a predetermined speed or less is satisfied. As a result, it is possible to reduce the probability of failure of the electric propulsion system when one of the main engines 31 and 32 stops and ensure the reliability of the aircraft 100.

Further, in this embodiment, the extracted torque extracted from the generator is limited to 10% or less of the maximum value of the extracted torque in the case where the rotation speed of the engine shaft 38 of the main engine section 30 is 60% or less of the maximum rotation speed of the engine shaft 38 at that altitude. As a result, for example, it is possible to solve the problem that the main engine section 30 suddenly stops during descent.

Further, in this embodiment, the extracted torque extracted from the generator is limited to 10% or less of the maximum value of the extracted torque in the case where the engine output of the main engine section 30 is 60% or less of the maximum value of the engine output at that altitude. As a result, for example, it is possible to solve the problem that the main engine section 30 suddenly stops during descent.

REFERENCE SIGNS LIST

10 fuselage section
20 main wing section
30 main engine section
40 BLI propulsion section
42 impeller
45 intake port
50 landing section
100 aircraft

The invention claimed is:

1. An aircraft, comprising:
a fuselage section that has a cylindrical shape with a first predetermined length in an axial direction and a second predetermined length in a width direction and a vertical direction, and includes a rear end portion on a rear side in the axial direction, wherein the first predetermined length is longer than the second predetermined length, wherein the fuselage section has a shape in which an outer diameter gradually decreases toward the rear end portion on the rear side, wherein a center position of the rear end portion is located above a center position of the fuselage section at a position corresponding to a maximum diameter of the fuselage section in the vertical direction; and
a boundary layer ingestion (BLI) propulsion device that is provided on the rear side of the fuselage section and includes an intake port, wherein a center position of the intake port is located between the center position of the fuselage section and the center position of the rear end portion in the vertical direction, and wherein the center position of the intake port is offset below the center position of the rear end portion in the vertical direction, wherein the BLI propulsion device includes at least one impeller that is rotatable with an axis directed in the axial direction as a central axis, and wherein a position of the central axis is offset above the center position of the intake port in the vertical direction.

2. The aircraft according to claim 1, wherein a non-overlapping region exists where a region corresponding to the maximum diameter of the fuselage section and a region corresponding to the intake port do not overlap with each other when the maximum diameter of the fuselage section and the intake port are viewed from the axial direction, and wherein an area of the non-overlapping region occupies less than 60%.

3. The aircraft according to claim 1, wherein a value of AR is 1.3 or more, AR being represented by $(2a)^2/\text{Sfan}$, 2a being a length of the intake port in the width direction, Sfan being an area of the intake port.

4. The aircraft according to claim 1, wherein the at least one impeller includes a first impeller and a second impeller aligned in the width direction, and wherein a rotation direction of the first impeller and a rotation direction of the second impeller are in opposite directions.

5. The aircraft according to claim 4, wherein the rotation direction of each of the first impeller and the second impeller is a rotation direction corresponding to inboard-up rotation.

6. The aircraft according to claim 1, wherein the at least one impeller has a central axis of rotation located outside the center position of the intake port in the width direction.

7. The aircraft according to claim 1, further comprising:

a landing section provided below the fuselage section; and an angle formed between the axial direction and a tangent connecting a ground contact point of the landing section and the lowest point of the BLI propulsion device when the fuselage section and the landing section are viewed from the width direction, wherein the angle exceeds 10.5°.

8. The aircraft according to claim 1, wherein the intake port is disposed behind a position where a width of the fuselage section is 50% of a maximum value of the width of the fuselage section in the axial direction.

9. The aircraft according to claim 1, wherein a position of the BLI propulsion device corresponding to the center position of the intake port is not joined to the fuselage section.

10. The aircraft according to claim 1, wherein the intake port is disposed behind a position where a cross-sectional area of the fuselage section perpendicular to the axial direction is 25% of a maximum value of the cross-sectional area in the axial direction.

11. The aircraft according to claim 1, further comprising:

a main engine section that includes a generator, the BLI propulsion device being driven by electric power from the generator.

12. The aircraft according to claim 11, wherein the generator is operated at an extracted torque within a range of 90% to 100% of a maximum torque of the generator, regardless of an operating state of the aircraft.

13. The aircraft according to claim 11, wherein power extracted from the generator is limited to a predetermined value or less in a case where at least one of a condition that an altitude of the aircraft is a predetermined altitude or less and a condition that speed of the aircraft is a predetermined speed or less is satisfied.

14. The aircraft according to claim 13, wherein the main engine section includes a plurality of main engines each including the generator, and wherein power extracted from the generator is limited to a predetermined value or less in a case where a condition that at least one of the plurality of main engines has stopped is satisfied in addition to a condition that the at least one of the two conditions is satisfied.

15. The aircraft according to claim 11, wherein the main engine section includes an engine shaft that rotates to cause the generator to generate electric power, and wherein an extracted torque extracted from the generator is limited to 10% or less of a maximum value of the extracted torque in a case where a rotation speed of the engine shaft of the main engine section is 60% or less of a maximum rotation speed of the engine shaft.

16. The aircraft according to claim 11, wherein an extracted torque extracted from the generator is limited to 10% or less of a maximum value of the extracted torque in a case where an engine output of the main engine section, when the aircraft flies at a predetermined altitude, is 60% or less of a maximum value of the engine output the predetermined altitude.

* * * * *